United States Patent
Burrow et al.

(10) Patent No.: US 9,843,129 B2
(45) Date of Patent: Dec. 12, 2017

(54) FLUSHING ARRANGEMENT

(71) Applicant: Siemens Aktiengesellschaft, Munich (DE)

(72) Inventors: Christopher Burrow, Ulverston (GB); Christopher Plant, Lancaster (GB)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 73 days.

(21) Appl. No.: 15/024,041

(22) PCT Filed: Sep. 24, 2014

(86) PCT No.: PCT/EP2014/070380
§ 371 (c)(1),
(2) Date: Mar. 23, 2016

(87) PCT Pub. No.: WO2015/044208
PCT Pub. Date: Apr. 2, 2015

(65) Prior Publication Data
US 2016/0233608 A1    Aug. 11, 2016

(30) Foreign Application Priority Data
Sep. 30, 2013 (EP) .................................... 13186722

(51) Int. Cl.
*H01R 4/60* (2006.01)
*H01R 13/523* (2006.01)
(Continued)

(52) U.S. Cl.
CPC ......... *H01R 13/523* (2013.01); *E21B 17/028* (2013.01); *E21B 33/0385* (2013.01);
(Continued)

(58) Field of Classification Search
CPC .............. H01R 13/523; H01R 13/5202; H01R 13/5213; H01R 13/5216; H01R 13/5219;
(Continued)

(56) References Cited

U.S. PATENT DOCUMENTS 4,073,562 A * 2/1978 Karlskind ............ H01R 13/523
439/199
5,838,857 A    11/1998 Niekrasz
(Continued)

FOREIGN PATENT DOCUMENTS

EP    0162543 A2    11/1985
EP    0235365 A2    9/1987
(Continued)

OTHER PUBLICATIONS

Extended European Search Report dated Feb. 11, 2014.
(Continued)

*Primary Examiner* — Tulsidas C Patel
*Assistant Examiner* — Travis Chambers
(74) *Attorney, Agent, or Firm* — Harness, Dickey & Pierce P.L.C.

(57) ABSTRACT

A flushing arrangement for flushing a surface of a wet-mateable connector for subsea use is provided. The flushing arrangement has a cartridge adapted to form a chamber around the surface to be flushed prior to flushing. The cartridge has a sealing portion adapted to be sealed against a part of the connector. An inlet port for receiving a fluid from a fluid source and an outlet port for discharging a fluid are provided. Plural flow channels are formed in the cartridge, the plural flow channels comprising flow channels providing a fluid connection between the inlet port and the chamber for enabling a flow of fluid into the chamber and (Continued)

flow channels providing a fluid connection between the chamber and the outlet port for enabling a flow of medium out of the chamber.

29 Claims, 8 Drawing Sheets

(51) Int. Cl.
    *H01R 13/52*     (2006.01)
    *E21B 33/038*     (2006.01)
    *E21B 17/02*     (2006.01)
    *G02B 6/38*     (2006.01)

(52) U.S. Cl.
    CPC ..... *H01R 13/5213* (2013.01); *H01R 13/5216* (2013.01); *H01R 13/5219* (2013.01); *H01R 13/5227* (2013.01); *G02B 6/3816* (2013.01)

(58) Field of Classification Search
    CPC . H01R 13/5227; G02B 6/3816; E21B 17/028; E21B 33/0385
    USPC .......................... 439/421, 201, 205, 271, 276
    See application file for complete search history.

(56) References Cited

U.S. PATENT DOCUMENTS

| | | | |
|---|---|---|---|
| 6,017,227 A | 1/2000 | Cairns et al. | |
| 8,702,439 B1* | 4/2014 | Paulsel | H01R 13/5216 439/271 |
| 9,716,339 B2* | 7/2017 | Burrow | H01R 13/523 |
| 2003/0007738 A1 | 1/2003 | Cairns et al. | |
| 2004/0266240 A1 | 12/2004 | Abbey et al. | |
| 2013/0157490 A1* | 6/2013 | Allton | H01R 24/00 439/198 |
| 2017/0005448 A1* | 1/2017 | Williams | H01R 43/005 |

FOREIGN PATENT DOCUMENTS

| | | |
|---|---|---|
| EP | 2520757 A2 | 11/2012 |
| GB | 2389466 A | 12/2003 |
| GB | 2402560 A | 12/2004 |
| WO | WO-9845899 A1 | 10/1998 |
| WO | WO-9931540 A1 | 6/1999 |

OTHER PUBLICATIONS

International Preliminary Report on Patentability dated Jan. 13, 2016.
International Search Report PCT/ISA/210 for International Application No. PCT/EP2014/070380 dated May 8, 2015.
Written Opinion of the International Searching Authority PCT/ISA/237 for International Application No. PCT/EP2014/070380 dated May 8, 2015.
P Weiss et al: "Novel wet-mate connectors for high voltage and power transmissions of ocean renewable energy systems", Aug. 1, 2012, XP055099712, URL:http://www.icoe2012dublin.com/icoe_2012/downloads/papers/day3/2.8 Cables and Connectors/Peter Weiss—Powersea.pdf, pp. 6.

* cited by examiner

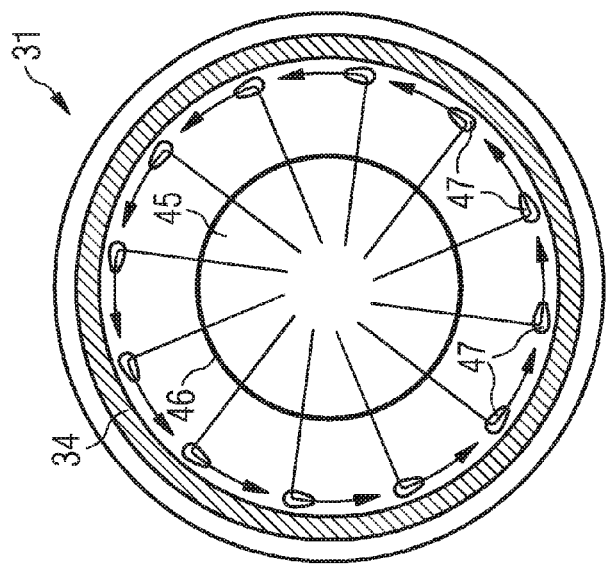
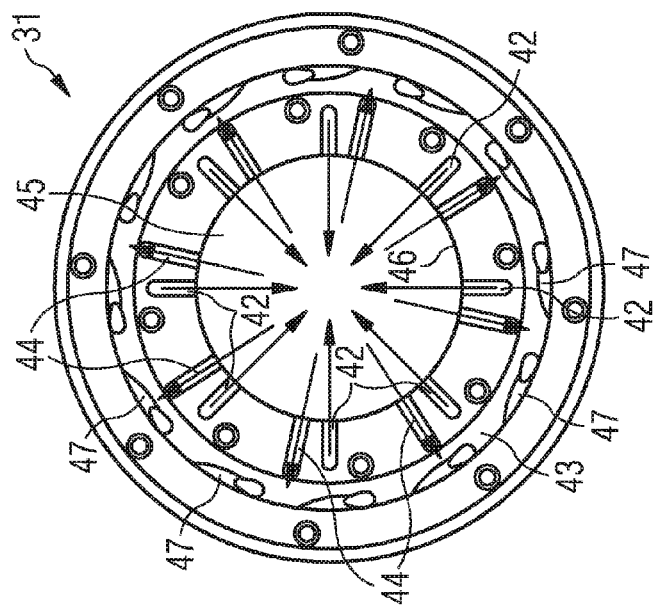
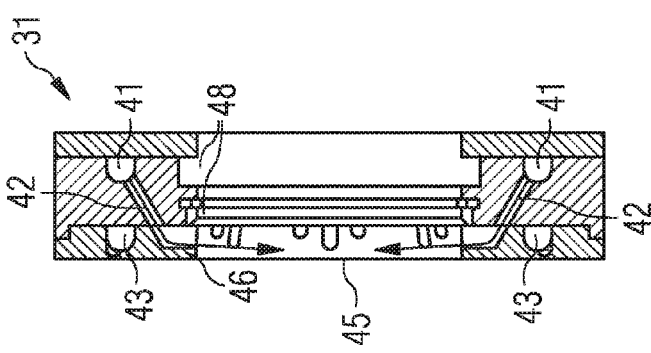

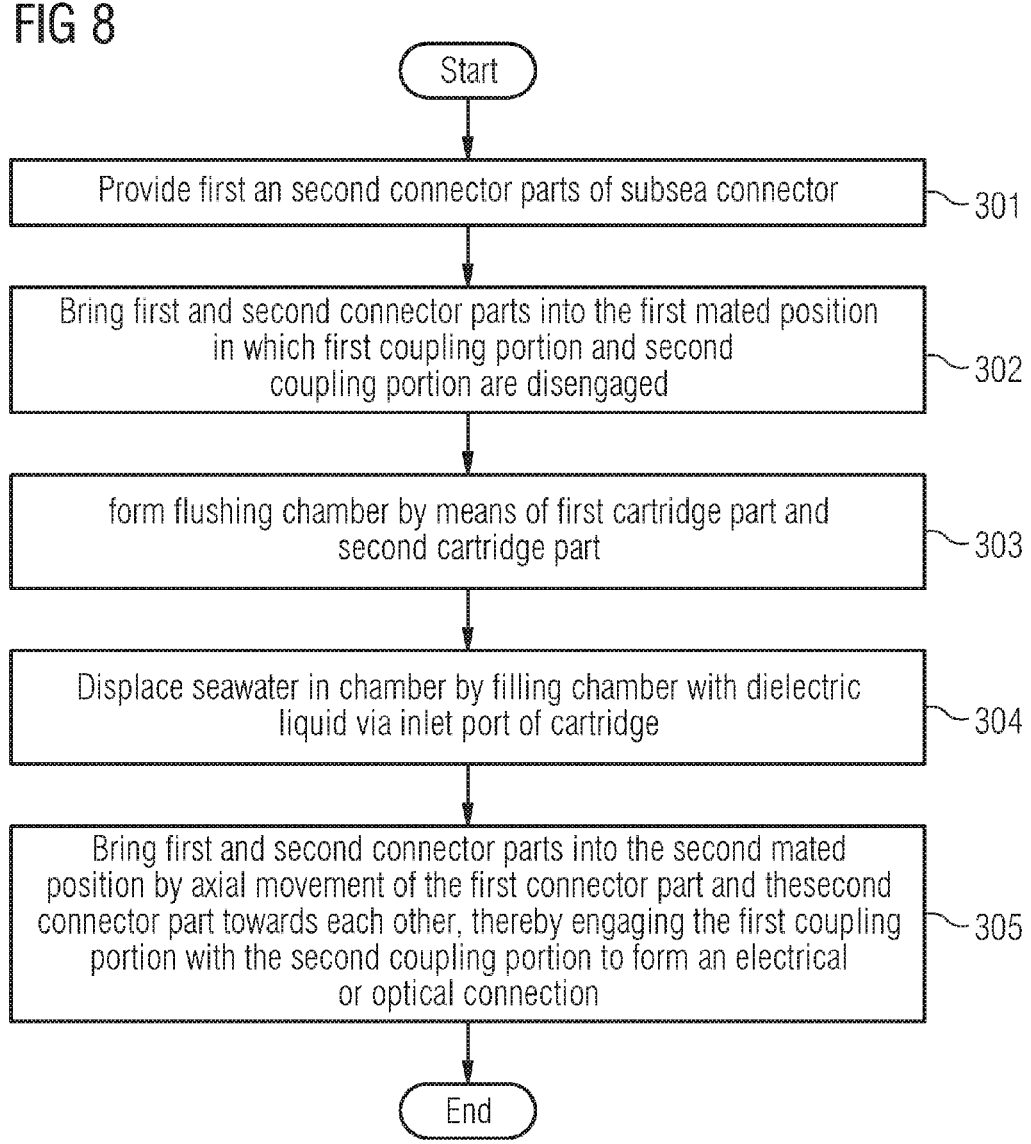

FLUSHING ARRANGEMENT

PRIORITY STATEMENT

This application is the national phase under 35 U.S.C. §371 of PCT International Application No. PCT/EP2014/070380 which has an International filing date of Sep. 24, 2014, which designated the United States of America and which claims priority to European patent application number EP13186722.8 filed Sep. 30, 2013, the entire contents of which are hereby incorporated herein by reference.

FIELD

An embodiment of the invention generally relates to a flushing arrangement and in particular to a flushing arrangement for a subsea connector.

BACKGROUND

Several applications are known in which electrical connections need to be provided underwater. Examples include a subsea installation for the production of hydrocarbons from a subsea well, in which different components of the subsea installation may need to be connected electrically. Such connections may for example comprise a connection from a topside installation, such as a floating or fixed platform, or from an onshore site to a subsea component, e. g. by an umbilical or a subsea cable. Other connections include electrical connections between different type of subsea equipment, such as a connection between a subsea transformer and subsea switchgear, electrical connections to a pump or a compressor or the like.

For providing an underwater electrical connection, wet-mateable connectors are known which can be mated underwater. Although such type of connectors are generally more complex than corresponding dry-mate connectors, which have to be mated above water, wet-mateable connectors have several advantages. Components of the subsea installation can for example be disconnected and can be retrieved for servicing or exchange, additional components may be connected to an existing subsea installation, electric connections can be provided to a subsea structure after installation thereof at the ocean floor, and the like.

A general problem with such subsea connectors is the corrosive character of seawater. Seawater generally causes corrosion and degradation of materials exposed thereto. Exposed surfaces are furthermore prone to the growth of organic material thereon, such as algae, bacteria and the like. Such marine growth can be detrimental to the functioning of the subsea connector.

Accordingly, in order to protect exposed surfaces when the connector parts are unmated (e.g. when a connector part is unplugged and not in use), it is known to use "dummy plugs" or "dummy receptacles" to which the connector part is mated. Components of the connector part, such as a pin, can thus be protected effectively from the surrounding seawater. Such dummy plug generally needs to include all features of a standard plug at its connecting section, but does not connect to a cable but only to a dummy gland, which isolates the pin from the metal works and which may be used for electrical testing. As such fully functional dummy plug may need to be provided for each un-mated connector part, significant costs can be incurred.

Furthermore, it is known to flush connector parts before mating by filtered seawater to remove debris, such as described in EP 2520757 A2. Even with such prior cleaning of the contact portions of the connector, the electrical contact provided by the connector may be degraded due to the exposure of the contact surfaces to seawater.

In particular at high voltages, e. g. voltages above 5,000 V, 10,000 V or even 30,000 V, even a minor degradation of the electrical contact provided by the connector may have significant consequences, such as a reduced lifetime of the connection, or even a failure in the connection. The same applies to optical connections, in which marine growth or debris may sincerely affect the quality of the connection or may even result in the connection not being established.

It is thus desirable to at least reduce the effects of seawater on a connection provided by such wet-mateable connector. It is desirable to provide a connection in a reliable and effective way. Furthermore, the complexity of the connector should not be increased significantly. Also, it is desirable that the connector parts remains operational over a relatively large number of mating/demating cycles and have a relatively long lifetime. It is in particular desirable to provide an improved connector for subsea use in a cost-efficient way.

SUMMARY

The inventors have recognized that there is a need to obviate at least some of the drawbacks mentioned above and in particular to reduce the effect of seawater on the operation of a wet-mateable connector.

The claims describe embodiments of the invention.

According to an embodiment of the invention, a connector for subsea use is provided. The connector has a first connector part and a second connector part adapted to be mated subsea. The connector comprises a first coupling portion arranged in the first connector part and a second coupling portion arranged in the second connector part. The first and second coupling portions are configured to be brought into engagement for establishing an electrical or optical connection when the first connector part and the second connector part are mated (the connection may for example be established in a fully mated position). The connector further comprises a first protection assembly forming part of the first connector part, the first protection assembly being configured to prevent the exposure of the first coupling portion to seawater when the connector is unmated and deployed subsea, and a second protection assembly forming part of the second connector part, the second protection assembly being configured to prevent the exposure of the second coupling portion to seawater when the connector is unmated and deployed subsea. The connector further comprises a flushing arrangement configured to enable a flushing of a surface of at least one of the first and second protection assemblies.

According to a further embodiment, a subsea connection system comprising a connector in any of the above described configurations is provided. The subsea connection system further comprises a mating tool for assisting the mating of the first connector part and the second connector part. The mating tool comprises a first fluid port connectable to an inlet port of the flushing arrangement of the connector for providing a non-seawater medium to the flushing arrangement and a second fluid port connectable to an outlet port of the flushing arrangement for receiving a fluid from the flushing arrangement. By way of such mating tool, the mating procedure and the flushing of the surface of the protection assembly of the connector can be performed in an efficient way.

A further embodiment of the invention provides a method of mating a first connector part and a second connector part of a connector in a subsea environment. The method comprises the step of providing the first and second connector parts in an unmated state in which a first coupling portion arranged in the first connector part is protected from seawater by a first protection assembly forming part of the first connector part and in which a second coupling portion arranged in the second connector part is protected from seawater by a second protection assembly forming part of the second connector part. Further steps of the method include bringing the first and second connector parts into a first mated position in which the first coupling portion and the second coupling portion are disengaged, flushing a surface of at least one of the first and second protection assemblies by way of a flushing arrangement and bringing the first and second connector parts into a second mated position in which the first and second coupling portions are in engagement to establish an electrical or optical connection. By way of such method, advantages similar to the ones outlined further above with respect to the connector may be achieved. In particular, the first and second coupling portions may be brought into engagement without being exposed to seawater, and the danger of dragging seawater into the first or second protection assemblies is further reduced.

According to a further aspect of the invention, a flushing arrangement for flushing a surface of a wet-mateable connector for subsea use is provided. The flushing arrangement comprises a cartridge adapted to form a chamber around the surface to be flushed prior to flushing. The cartridge has a sealing portion adapted to be sealed against a part of the connector, it may be sealed against the surface to be flushed. The flushing arrangement further comprises an inlet port for receiving a fluid from a fluid source and an outlet port for discharging a fluid. Plural flow channels are formed in the cartridge, and the plural flow channels comprise flow channels providing a fluid connection between the inlet port and the chamber for enabling a flow of fluid into the chamber and flow channels providing a fluid connection between the chamber and the outlet port for enabling a flow of a medium out of the chamber.

BRIEF DESCRIPTION OF THE DRAWINGS

The foregoing and other features and advantages of the invention will become further apparent from the following detailed description read in conjunction with the accompanying drawings. In the drawings, like reference numerals refer to like elements.

FIG. 7A is a schematic drawing showing a sectional side view of a cartridge of a flushing arrangement according to an embodiment of the invention.

FIG. 7B is a schematic drawing showing a sectional top view of a cartridge of a flushing arrangement according to an embodiment of the invention.

FIG. 7C is a schematic drawing showing a top view of a cartridge of a flushing arrangement according to an embodiment of the invention.

FIG. 8 is a flow diagram illustrating a method according to an embodiment of the invention.

DETAILED DESCRIPTION OF THE EXAMPLE EMBODIMENTS

Figure 1:
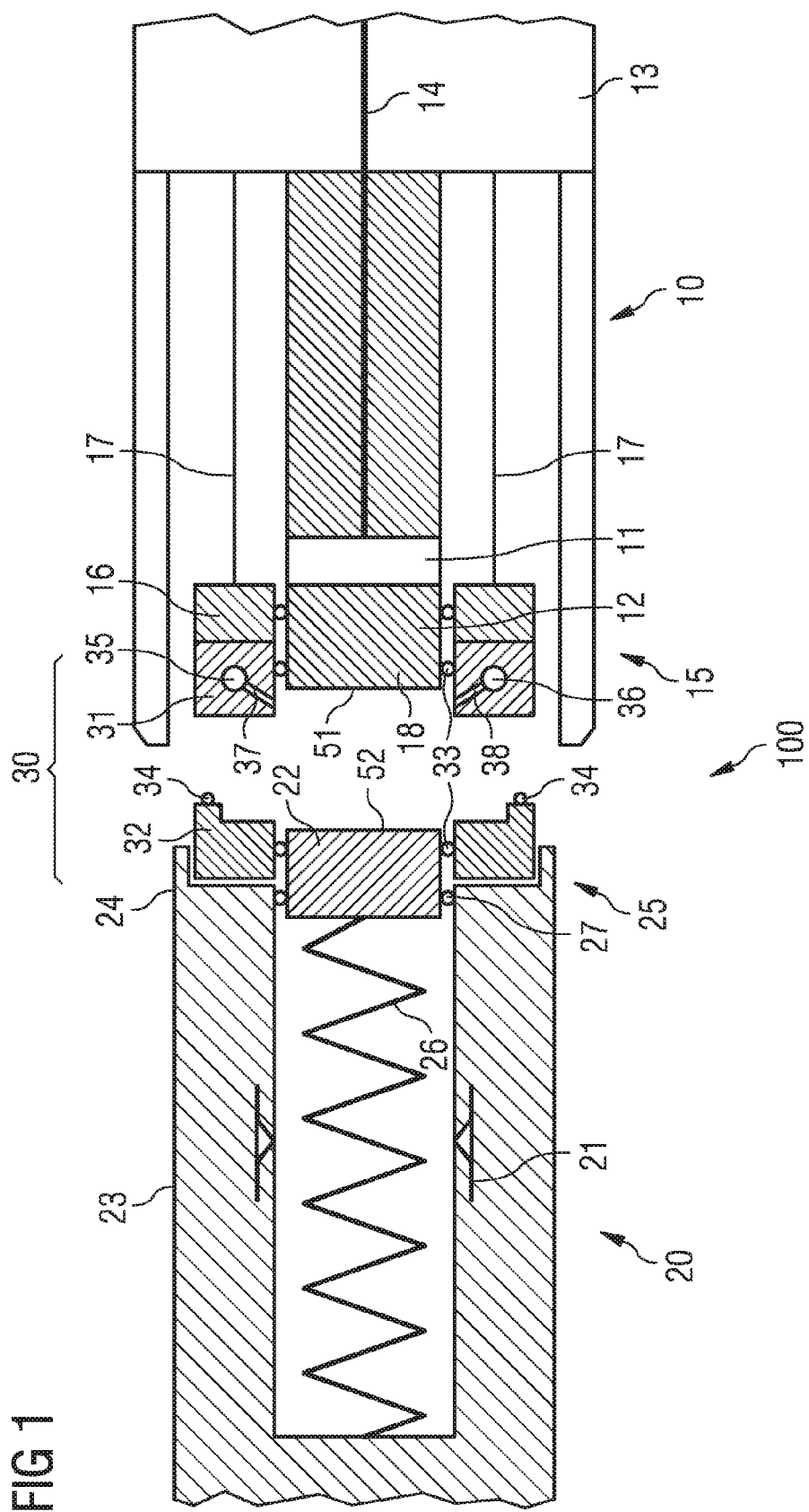
FIG. 1 is a schematic drawing showing a sectional view of a connector according to an embodiment of the invention in an unmated state.

According to an embodiment of the invention, a connector for subsea use is provided. The connector has a first connector part and a second connector part adapted to be mated subsea. The connector comprises a first coupling portion arranged in the first connector part and a second coupling portion arranged in the second connector part. The first and second coupling portions are configured to be brought into engagement for establishing an electrical or optical connection when the first connector part and the second connector part are mated (the connection may for example be established in a fully mated position). The connector further comprises a first protection assembly forming part of the first connector part, the first protection assembly being configured to prevent the exposure of the first coupling portion to seawater when the connector is unmated and deployed subsea, and a second protection assembly forming part of the second connector part, the second protection assembly being configured to prevent the exposure of the second coupling portion to seawater when the connector is unmated and deployed subsea. The connector further comprises a flushing arrangement configured to enable a flushing of a surface of at least one of the first and second protection assemblies.

Such configuration may achieve that neither in an unmated state, nor during mating; the first and second coupling portions are exposed to seawater. For providing an electrical or optical connection during mating, the first and second protection assemblies may need to expose the first and second coupling portions. By flushing the surface of the first and/or second protection assembly, it can be prevented that seawater wetting such surface of the respective protection assembly can enter or is dragged into one of the first or second protection assemblies and thus comes into contact with a coupling portion. The flushing arrangement may in particular be configured to perform the flushing so as to prevent ingress of seawater into the first or second protection assemblies during mating. The coupling portion may be an electrical contact portion, such as a contact ring on a pin or a contact sleeve, or it may be an optical coupling, or may comprise a combination thereof.

In an embodiment, the surface which is to be flushed comprises a surface which enters the first protection assembly or the second protection assembly when the first coupling portion is brought into engagement with the second coupling portion. It may for example a front face of a pin or shuttle pin of the first or second connector part. By flushing such surface, it may be prevented that seawater adhering to the surface is allowed to enter the protection assembly.

In an embodiment, the surface comprises an exposed surface of the first and/or second protection assembly which is exposed to seawater when the first connector part and the second connector part are unmated and deployed subsea. The flushing arrangement may be configured so as to enable the displacement of the seawater at the exposed surface by a non-seawater medium prior to engaging the first coupling portion and the second coupling portion. The flushing arrangement may for example be configured to form a chamber around such exposed surface so as to enable the replacement of seawater at the exposed surface.

In an embodiment, the first and second protection assemblies and the flushing arrangement are configured such that a flushing operation performed by the flushing arrangement does not flush the first and the second coupling portions. As the first and second coupling portions are not exposed to seawater, the flushing may be restricted to the flushing of surfaces of the first and second protection assemblies. This does not exclude that during mating, one of the coupling portions may move through a chamber formed by the flushing arrangement.

The non-seawater medium may be a fluid, in particular a predetermined liquid, preferably a dielectric liquid. An example of the non-seawater medium is oil, e. g. silicone oil, or the like. Such type of non-seawater medium will generally not have a degrading effect on the connection to be established by the first and second coupling portions.

In an embodiment, the first connector part comprises a first element of the flushing arrangement and the second connector part comprises a second element of the flushing arrangement, wherein the first element and the second element form a chamber when the first connector part is mated with the second connector part in a first mated position (or mated state). The surface to be flushed is located within the chamber, and the flushing arrangement is configured to enable the filling of the chamber with a non-seawater medium. In such configuration, the flushing arrangement may form a chamber that is liquid tight sealed against the environment, in particular against ambient seawater. Such chamber can enable the exchange of medium in the chamber, for example the exchange of seawater by a non-seawater medium or the exchange of such non-seawater medium by seawater.

The exposed surface of the first and/or second protection assemblies and the first and second elements of the flushing arrangement may participate in forming the chamber, i.e. the exposed surface may form part of a wall or boundary of the chamber.

The first and/or second element of the flushing arrangement may form part of the first and/or second connector part, respectively. The first or second element may for example be part of a housing of the respective connector part or part of the protection assembly of the respective connector part.

The flushing arrangement may in some embodiments comprise a cartridge. In some embodiments, the first or second element of the flushing arrangement may be such cartridge, and the other of the first or second elements may be part of the respective connector part. As an example, one element of the flushing arrangement may be a cartridge and the other element of the flushing arrangement may be a surface on a connector part, e. g. a front surface of a plug part or a front surface of the protection assembly of one of the first or second connector parts. In other embodiments, the cartridge may have a first cartridge part and a second cartridge part. The first and second elements of the flushing mechanism may be first and second cartridge parts of the cartridge.

Possible configurations of such flushing arrangement including a cartridge are described herein further below. The flushing arrangement of the present embodiments may have any of the below described configurations.

The first mated position may be a flushing position in which the flushing arrangement forms the chamber and in which flushing of the chamber is performed; it may also be termed "initial mating position". A second mated position may be a position in which the first and second connector parts are in full engagement, and in which the connection between the first and second coupling portions is made; it may also be termed "fully mated position".

In an embodiment, the first connector part comprises a pin, the first element of the flushing mechanism having a first opening in which a front portion of the pin is located in the first mated position. The surface that is to be flushed is a surface on the front portion of the pin. The second element of the flushing arrangement may have a second opening formed so as to allow the passage of the pin through the second opening when the first connector part is moved from the first mated position into a second mated position.

In such configuration, it is possible to flush a front face of the pin within the above mentioned chamber, and thereafter move the pin through the second element of the flushing arrangement into the second protection assembly for establishing the connection. The front portion of the pin may also be termed "pin tip".

The pin may for example have a cylindrical outer surface, and the first opening in the first element and the second opening in the second element of the flushing arrangement may have an inner cylindrical surface each comprising a circumferential seal for sealing against the outer cylindrical surface of the pin. The seal may for example be a gland type seal, a gland seal, a piston seal or the like.

The first element of the flushing arrangement may have an annular shape and may be mechanically coupled to a sliding carriage. The first element and the sliding carriage may be configured to be slidable along the pin of the first connector part into a second mated position, with an inner surface of the annular first element being sealed against a front portion of the pin in the unmated position and in the first mated position. By coupling the first element of the flushing arrangement to the sliding carriage, it is possible that the pin is protected from the subsea environment in an unmated position, while the pin is exposed during mating so that the pin can enter the second protection assembly of the second connector part. During mating, the pin passes through the opening in the annular first element when the annular first element and the sliding carriage slide into the second mated position.

In the unmated position, the annular first element of the flushing arrangement may in some embodiments protrude from the pin's front face to form a recess, which later forms the chamber for flushing when the two connector parts are brought into the first mated state. In other embodiments, the annular first element may be retracted such that the annular first element and the pin's front face are essentially flush or such that the pin's front face protrudes from the first element. In such state, flow channels which may have ports in an inner cylindrical face of the annular element, may be protected by the pin from the subsea environment when in the unmated position.

In an embodiment, at least one of the first and second elements has a seal adapted to be sealed against the other of the first and second elements. The seal is configured to provide a liquid tight sealing of the chamber in the first mated position of the first and second connector parts. As an example, the first and second elements may have annular faces facing each other in the first mated position, and the seal may be provided as a circular seal between these faces, for example in the form of an O-ring. The seal may be made of a plastic material, in particular a polymer material, such as PEEK (polyetheretherketone), preferably PTFE (polytetrafluoroethylene) loaded PEEK.

The flushing arrangement may comprise an inlet port for introducing the non-seawater medium into the chamber and an outlet port for collecting a fluid leaving the chamber. As an example, the inlet port and the outlet port may be provided in the first element of the flushing arrangement. Different configurations are conceivable in other embodiments, for example providing the inlet port and the outlet port in the second element.

The flushing arrangement may furthermore comprise a collection tank for collecting a fluid leaving the chamber, e. g. via the outlet port. Accordingly, if a non-seawater medium, such as a dielectric liquid, in particular oil, is introduced into the chamber, medium spilling out of the chamber during flushing, or medium being flushed out of the chamber by seawater prior to de-mating can be collected in the collection tank so as to prevent a pollution of the surrounding environment.

In an embodiment, the first and/or second elements of the flushing arrangement are made of a plastic material, in particular a thermoplastic material, preferably a polymer material, such as PEEK. Such configuration of the first and second elements of the flushing arrangement allows a simple and lightweight construction of the flushing arrangement, which does not require extensive modification of existing connectors for being used therewith. Furthermore, it allows for the introduction of complex flow structures into the flushing arrangement which can be shaped so as to improve the removal of seawater from the chamber and thus the flushing of the above mentioned surface.

In an embodiment, at least one of the first and second elements of the flushing arrangement is radially floating to facilitate alignment of the respective first or second element of the flushing arrangement with a pin of the first connector part during mating.

The second element of the flushing arrangement may for example be provided in a cylindrical recess in a plug body of the second connector part. Such cylindrical recess may have an inner diameter which is slightly larger than the diameter of an outer cylindrical face of the second element so that the second element can to a certain extent change its radial position when mounted to the front portion of the plug body. When moving from the first mated position into the second mated position, the pin may move towards the second element, and the second element can, due to the floating mount, align itself with the front portion of the pin so that the pin can enter and pass through the opening in the second element of the flushing arrangement. By providing such tolerance, the production of the connector may be facilitated, and a more reliable mating may be achieved.

In an embodiment, at least one of the first and second elements of the flushing arrangement may be provided with flow channels which are configured so as to achieve a flow without stagnation points inside the chamber during flushing. Accordingly, with such flow, seawater filling the chamber may be flushed out almost completely by the non-seawater medium prior to mating. Stagnation point generally refers to a point in a flow at which the local velocity of the fluid is about zero. By providing a flow without stagnation points, the possibility of having locations or vortices at which seawater is trapped during flushing is reduced, thereby improving the quality of flushing.

In an embodiment, the first protection assembly comprises a front portion of a pin and the second protection assembly comprises a shuttle pin. The surface to be flushed may comprise at least the front face of the pin and a front face of the shuttle pin, which generally are exposed surfaces which are exposed to seawater when the first connector part and the second connector parts are unmated and deployed subsea. The flushing arrangement may be configured to enable a flushing of at least the front face of the pin and the front face of the shuttle pin prior to engaging the first coupling portion and the second coupling portion.

The chamber for flushing may for example be formed by the tip of the pin, the tip of the shuttle pin, and the first and second elements of the flushing arrangement. By flushing the front face of the pin and the front face of the shuttle pin, it can be prevented that seawater adheres or is trapped between the two faces when they engage during mating. Seawater may thus be prevented from entering the second protection assembly when the pin and the shuttle pin are together pushed into the second protection assembly, in particular into the plug body of the second connector part. Protection of the coupling elements from seawater can thus be improved.

In an embodiment, the connector is configured to have a first mated position in which the first connector part engages the second connector part, and in which the flushing arrangement forms a chamber for flushing the above mentioned surface. The connector may further have a second mated position in which the connector can be brought by axial movement of the first and second connector parts towards each other (they are for example moved into further engagement). In the first mated position, the first and second coupling portions are disengaged, and in the second mated position, the first and second coupling portions are in engagement. By providing the connector in such configuration, the connector itself does not need to comprise any actuators or movable mechanical elements for engaging the first and second coupling portions. Rather, it is possible to move the connector into the second mated position, in particular into the fully mated position, by a force applied externally, e. g. via an ROV or a mounting tool. The complexity of the connector can thus be kept relatively low.

In an embodiment, the first connector part comprises a pin, a front portion of the pin being exposed to seawater when the first connector part is deployed subsea. The first protection assembly may comprise a sliding carriage which is in sealing engagement with the front portion of the pin in an unmated state of the first connector part, and the front portion of the pin itself. The first coupling portion is arranged on the pin rearwardly of the front portion of the pin, and the sliding carriage is slidable along the pin such that it is movable between an unmated position in which the first coupling portion is protected from seawater by the sliding carriage and a mated position in which the sliding carriage is positioned rearwardly of the first coupling portion. Accordingly, by way of the sliding carriage, it is possible to expose the first coupling portion so that it can make contact with the second coupling portion of the other connector part. The first coupling portion is generally exposed only during mating, so that it does not get into contact with the subsea environment, but rather enters into the second protection assembly of the second connector part, where it is again protected. Furthermore, a flexible diaphragm may be provided between the sliding carriage and a supporting portion of the first connector part, in particular a support of the pin. Such flexible diaphragm may provide protection from the subsea environment for the rear portion of the pin and may furthermore allow the sliding carriage to move backwardly in order to expose the first coupling portion. The flexible diaphragm may for example be filled with a liquid, such as a dielectric liquid.

In an embodiment, the second connector part is a plug part having a plug body with a front portion (may also be termed "plug nose"), and the second protection assembly comprises a shuttle pin having a front portion (also termed "shuttle pin tip") and at least a front portion of the plug body. The front portion of the plug body and the front portion of the shuttle pin are exposed to seawater when the second connector part is deployed subsea in an unmated state of the second connector part. The front portion of the plug body is in sealing engagement with the front portion of the shuttle pin, so that ingress of seawater into the plug body may be prevented. The second coupling portion is located rearwardly of the front portion of the shuttle pin within the plug body. Protection of the coupling portion from subsea environment may thus be achieved. The front portion of the shuttle pin is movable into the plug body into a position rearwardly of the second coupling portion. Such configuration allows a pin of the first connector part to enter the plug body and allows the first coupling portion to get into contact with the second coupling portion. Movement of the shuttle pin to a position rearwardly of the second coupling portion essentially exposes the second coupling portion to the pin tip.

The second coupling portion may, when providing an electrical connection, for example be provided in the form of a sleeve-like component. It may for example be provided in form of a socket contact. A physical coupling between the coupling portion on the pin tip and such socket contact may for example be achieved by some type of compliant or spring-loaded component, so as to achieve a good electrical connection and allow for many make and break cycles. As an example, a Multilam contact may be used.

The outer diameter of the pin of the first connector part may essentially be the same as the outer diameter of the receptacle pin of the second connector part. Correspondingly, the inner diameter of the opening in the first element of the flushing arrangement may be substantially similar to the inner diameter of the opening in the second element of the flushing arrangement. This may ensure proper sealing against the outer surface of the pin when the pin moves through the first and second elements of the flushing arrangement and into the plug body of the second connector part during mating.

The flushing arrangement may furthermore comprise an excess pressure relieve valve. In such configuration, it can be ensured that the pressure within a chamber formed by the flushing arrangement stays below a predetermined pressure threshold. The threshold may for example be set so as to prevent the pressure from pushing the shuttle pin into the plug body of the second connector part.

The flushing arrangement may furthermore be provided with a volume compensator. The volume compensator may be configured to compensate volume changes of a medium within the chamber or of the chamber itself. By such volume compensator, it can be ensured that there is no significant pressure increase when the pin of the first connector part moves into the chamber formed by the flushing arrangement. When moving from the first mated position into the second mated position, the pin displaces medium located in the chamber formed by the flushing arrangement, and the volume compensator may take up such displaced medium. Several different configurations of the volume compensator are conceivable. It may for example comprise a flexible element, such as a bellow, bladder or the like which is in fluid communication with the volume inside the chamber, or it may comprise arrangements coupled to an inlet port or an outlet port of the flushing arrangement which allow liquid from within the chamber to be disposed through the respective port, e.g. a pressure relieve valve or the like.

The connector can in some embodiments be configured to be mateable without flushing. Accordingly, in less critical applications, the first and second connector parts may be mated without performing the flushing operation, thereby facilitating the mating procedure. By way of the first and second protection assemblies, exposure of the first and second coupling portions to seawater is nevertheless kept very low.

According to a further embodiment, a subsea connection system comprising a connector in any of the above described configurations is provided. The subsea connection system further comprises a mating tool for assisting the mating of the first connector part and the second connector part. The mating tool comprises a first fluid port connectable to an inlet port of the flushing arrangement of the connector for providing a non-seawater medium to the flushing arrangement and a second fluid port connectable to an outlet port of the flushing arrangement for receiving a fluid from the flushing arrangement. By way of such mating tool, the mating procedure and the flushing of the surface of the protection assembly of the connector can be performed in an efficient way.

In an embodiment, the tool may be a tool of a remotely operated vehicle (ROV), or may be part of such ROV. Mating of the first and second connector parts may thus be performed even at great water depths, e. g. in excess of 2.000 m.

In an embodiment, the subsea connection system further comprises a collection tank for collecting a fluid received from the flushing arrangement. As an example, when flushing out a chamber formed by the flushing arrangement with a non-seawater medium, or when replacing non-seawater medium within such chamber by seawater (e. g. prior to de-mating), the fluid coming out of the chamber can be collected, thereby preventing the pollution of the subsea environment.

In an embodiment, the mating tool comprises a pump adapted to provide an elevated pressure at the first fluid port for flowing a fluid into a chamber of the flushing arrangement. The fluid may for example be the above mentioned non-seawater medium, which is flushed into the chamber prior to mating, or it may be seawater, which can be flushed into the chamber prior to de-mating or after completion of the mating cycle.

In another embodiment, the mating tool may comprise a pump adapted to provide a reduced pressure at the second fluid port for removing a fluid from a chamber of the flushing arrangement. In such configuration, the fluid inside the chamber of the flushing arrangement may essentially be sucked out, thereby avoiding problems which may occur when increasing fluid pressure inside the chamber. Again, such configuration may be used to replace seawater inside the chamber by a non-seawater medium, or may be used to displace a non-seawater medium, such as a dielectric liquid, by seawater prior to de-mating or after completion of the mating cycle.

In a further embodiment, the mating tool may comprise a holding mechanism adapted to hold the first connector part and the second connector part in a first mated position in which the flushing of the surface by the flushing arrangement can be performed. With a subsea connection system in such configuration, it is not necessary to provide the first and second connector parts with additional locking mechanisms for locking them together in the first mated position when flushing the exposed surfaces.

A further embodiment of the invention provides a method of mating a first connector part and a second connector part of a connector in a subsea environment. The method comprises the step of providing the first and second connector parts in an unmated state in which a first coupling portion arranged in the first connector part is protected from seawater by a first protection assembly forming part of the first connector part and in which a second coupling portion arranged in the second connector part is protected from seawater by a second protection assembly forming part of the second connector part. Further steps of the method include bringing the first and second connector parts into a first mated position in which the first coupling portion and the second coupling portion are disengaged, flushing a surface of at least one of the first and second protection assemblies by way of a flushing arrangement and bringing the first and second connector parts into a second mated position in which the first and second coupling portions are in engagement to establish an electrical or optical connection. By way of such method, advantages similar to the ones outlined further above with respect to the connector may be achieved. In particular, the first and second coupling portions may be brought into engagement without being exposed to seawater, and the danger of dragging seawater into the first or second protection assemblies is further reduced.

In an embodiment, the step of bringing the first and second connector parts into a first mated position comprises forming a chamber around the surface of the respective protection assembly by way of a first element and a second element of the flushing arrangement. This may for example be done by providing a cartridge as the first or second element and sealing the cartridge against the other of the first or second element, e.g. against a front portion of the respective connector part or against another cartridge part. The step of flushing may comprise substituting a fluid in the chamber by a non-seawater medium. An effective removal of the seawater from the surface to be flushed may thus be achieved.

In an embodiment, the step of bringing the first and second connector parts into the second mated position may comprise pushing a pin of the first connector part through the chamber into engagement with a shuttle pin of the second connector part and into a plug body of the second connector part by axially moving the first connector part and the second connector part towards each other. By using such method for bringing the connector into the second mated position, a connector of relatively low complexity can be used, and the mating procedure is facilitated.

Embodiments of the method may be performed by using a connector in any of the above outlined configurations. Similarly, the above described connector may be configured so as to perform methods according to any of the embodiments described herein.

According to a further aspect of the invention, a flushing arrangement for flushing a surface of a wet-mateable connector for subsea use is provided. The flushing arrangement comprises a cartridge adapted to form a chamber around the surface to be flushed prior to flushing. The cartridge has a sealing portion adapted to be sealed against a part of the connector, it may be sealed against the surface to be flushed. The flushing arrangement further comprises an inlet port for receiving a fluid from a fluid source and an outlet port for discharging a fluid. Plural flow channels are formed in the cartridge, and the plural flow channels comprise flow channels providing a fluid connection between the inlet port and the chamber for enabling a flow of fluid into the chamber and flow channels providing a fluid connection between the chamber and the outlet port for enabling a flow of a medium out of the chamber.

Such flushing arrangement may allow a connector to be provided with a flushing mechanism in an efficient and relatively cost-efficient way. Furthermore, only minor modifications may be necessary for providing such connector with a flushing mechanism.

The cartridge may not form part of a housing of the first or second connector part of the connector. When the chamber for flushing is formed by the cartridge, the flushing arrangement is configured such that the chamber is sealed in a liquid tight manner against an ambient medium, i.e. against surrounding seawater when deployed subsea.

In an embodiment, the plural flow channels are configured to generate a flow without stagnation points in the chamber when providing a fluid via the inlet port. By such configuration of the flow channels, an efficient and substantially complete removal of a fluid located within the chamber becomes possible. In particular, no fluid, such as seawater, is trapped if a flow without stagnation points is generated by the flow channels. Furthermore, the flow channels may be configured to create an at least partially turbulent flow in the chamber for flushing the surface.

The cartridge is adapted to be capable of forming a chamber around the surface to be flushed. In use, the cartridge may thus first be brought into a state in which the chamber is formed and may then be used for flushing the surface.

In an embodiment, the sealing portion is provided on an inner cylindrical face of the cartridge and is adapted to provide sealing against an outer cylindrical face of a pin of a connector part of the connector. The sealing portion may for example be used to provide sealing against a front portion of a pin, in particular a receptacle pin provided in a receptacle part of the connector, or against a front portion of a shuttle pin of a plug part of the connector.

In some embodiments, the cartridge may be made of a single piece which is sealed against a portion of a connector part to form the above mentioned chamber.

In other embodiments, the cartridge has a first cartridge part adapted to be mounted to a first connector part and a second cartridge part adapted to be mounted to a second connector part of the connector. The flushing arrangement may further comprise a sealing element configured to provide a liquid tight seal between the first cartridge part and the second cartridge part when forming the chamber. Accordingly, by bringing the first connector part and the second part together, e. g. in a first mated state, the chamber for flushing may be formed by the first cartridge part and the second cartridge part. These may correspond to the above mentioned first element and second element of the flushing arrangement, and may be configured correspondingly.

As an example, the seal may be made of a plastic material, in particular a polymer material, such as PEEK, preferably PTFE loaded PEEK.

In an embodiment, the sealing portion and the inner cylindrical face form part of the first cartridge part, and the second cartridge part may comprise a second inner cylindrical face and a second sealing portion adapted to provide sealing against an outer cylindrical face of a shuttle pin of a second connector part of the connector. The first cartridge part may accordingly be sealed against a front portion or tip of the pin and the second cartridge part may be sealed against the front portion or tip of a shuttle pin.

The chamber may be formed by the first and second cartridge parts such that a front face of the pin and a front face of the shuttle pin are located within the chamber. The front faces of the pin and the shuttle pin may thus be flushed efficiently, which may avoid that seawater is dragged into the second protection assembly.

The first and second cartridge parts may have an annular shape with annular faces of the first and second cartridge parts facing each other when forming the chamber. The above mentioned sealing element can be provided on at least one of these annular faces.

The plural flow channels and the inlet and outlet ports can be provided in one of the first cartridge part or the second cartridge part. By providing them in only one cartridge part, the other cartridge part can be of a relatively low complexity. In other embodiments, they may be shared between the two cartridge parts.

The connector may have a first connector part in form of a receptacle part and a second connector part in form of a plug part. The first cartridge part may be adapted to be mounted to a protection assembly for a pin of the receptacle part and the second cartridge part may be adapted to be mounted to a front portion or plug nose of the plug part of the connector.

The first cartridge part and the second cartridge part may each have a cylindrical opening adapted to allow the passing of a pin of a connector part of the connector during mating. In such configuration, a relatively simple mating mechanism may be employed, while the cartridge is applicable to a range of subsea connectors.

The sealing portion may comprise a gland type seal, a gland seal or a piston seal. Other seals for providing a sealing between the inner cylindrical face of an opening in a cartridge part and the outer cylindrical face of a pin can also be used.

The outlet port may be connected to a collection tank for collecting fluid discharged from the chamber formed by the cartridge. Accordingly, if a fluid in the chamber is replaced by a non-seawater medium, such as a dielectric fluid, in particular oil, flushed out medium can be collected in the collection tank, thereby preventing a pollution of the subsea environment. Similarly, when replacing the non-seawater medium with seawater, the flushed out medium can be collected.

The cartridge of the flushing arrangement may be made of a plastic material, in particular a polymer material, e. g. a thermoplastic material. The cartridge may for example be made out of PEEK. In a preferred embodiment, the cartridge is made out of PTFE-loaded PEEK.

At least one part of the cartridge may be sized so as to provide a floating mount in a connector part of the connector. The cartridge may thus accommodate a radial misalignment between the connector part and the second connector part of the connector during mating. In particular, the entering of a receptacle pin into an opening provided in the cartridge part may be facilitated.

In an embodiment, at least a part of the cartridge is mountable to (or configured to be mounted to, or mounted to) a front portion of a connector part of the connector such that it is exposed to the subsea environment when the connector part is deployed subsea. Mounting the cartridge at such position has the advantage that it can be fitted to existing connectors to provide the connector with the flushing arrangement. Further, a surface of the connector that is exposed to seawater can be flushed, thus preventing the dragging of seawater into a protected area of the connector, e.g. an area in which the electrical or optical coupling portions or contacts are located. Front portion of the connector part refers to a portion that faces the complementary connector part during mating, it may for example be the tip of a pin of a receptacle part or the plug nose of a plug part of such connector.

The surface to be flushed may be an exposed surface that is exposed to the subsea environment when the connector is deployed subsea. The cartridge may be adapted to form the chamber around the exposed surface.

The connector may have a first connector part comprising a pin and a second connector part comprising a shuttle pin. The pin and the shuttle pin may have front faces that are exposed to seawater when the connector is deployed subsea. The front faces are the faces that face the respective other connector part when the connector parts are mated. The cartridge may be configured to form the chamber such that the front face of the pin and the front face of the shuttle pin are located within the chamber. Accordingly, these front faces can be flushed and the trapping of seawater between these front faces during mating can be prevented.

In an embodiment, the plural flow channels comprise an inlet flow channel connected to the inlet port and an outlet flow channel connected to the outlet port. They further comprise plural inlet distribution channels providing flow connections from the inlet flow channel to the chamber and plural outlet collection channels providing flow connections from the chamber to the outlet flow channel. This way, an effective flow pattern using which the fluid in the chamber can be exchanged almost completely by another fluid may be achieved. The inner distribution channels and the outlet collection channels can be arranged so as to create a flow without stagnation points.

The inlet flow channel and the outlet flow channel may be circular flow channels. The inlet distribution channels and the outlet collection channels may comprise radial channels running in a substantially radial direction. In this way, flow connections can be provided effectively into the chamber, which may have a cylindrical shape.

The cartridge may be formed so as to have an inner cylindrical face forming a boundary of the chamber, and a fraction, preferably all of the inlet distribution channels can be configured to provide the flow connections through the inner cylindrical face. A fluid provided via the inlet port can thus be distributed effectively in the chamber. The flow connections provided by the inlet distribution channels may for example be equally spaced in circumferential direction around the inner cylindrical face.

The cartridge may be formed so as to have an inner cylindrical face forming a boundary of the chamber. The plural outlet collection channels may comprise a first set of outlet collection channels configured to provide the respective flow connections through the inner cylindrical face. They may further comprise a second set of outlet collection channels configured to provide respective flow connection through an annular face of a first cartridge part of the cartridge facing a corresponding face of a second cartridge part of the cartridge when forming the chamber. In such configuration, it can be ensured that also from a cavity formed between the two annular faces of the two cartridge parts and the seal, fluid is effectively removed when flushing the chamber.

In the inner cylindrical face, the flow connections of the inlet distribution channels (may also be termed "inlet distribution ports") and the flow connections of the outlet collection channels (may also be termed "outlet collection ports") may be staggered. As mentioned above, these ports may be distributed circumferentially on the cylindrical face.

Some of the inlet distribution channels and/or outlet collection channels may be angled so as to create a circular flow within the chamber. In an embodiment, the outlet collection channels of the second set are angled so as to create a rotational flow in the outlet flow channel. Accordingly, it may be ensured that also within the outlet flow channel, which is connected to the outlet port, no stagnation points exist.

The cartridge may furthermore be configured such that when installed on a connector part of the connector, a front portion of a pin reaches through the first cartridge part, such that the flow connections through the inner cylindrical face of the cartridge part are sealed against ambient medium. Accordingly, marine growth which may clog these flow connections can be prevented when the connector is unmated.

Note that the flushing arrangement in any of the configurations described herein may be used with embodiments of the above described connector.

It is to be understood that the features mentioned above and those yet to be explained below can be used not only in the respective combinations indicated, but also in other combinations or in isolation, without leaving the scope of the present invention. In particular, the connector according to embodiments of the invention may comprise features as described with respect to embodiments of the method and of the flushing arrangement, and embodiments of the flushing arrangement may comprise features described with respect to the connector.

In the following, embodiments of the invention will be described in detail with reference to the accompanying drawings. It is to be understood that the following description of the embodiments is given only for the purpose of illustration and is not to be taken in a limiting sense. The drawings are to be regarded as being schematic representations only, and elements in the drawings are not necessarily to scale with each other. Rather, the representation of the various elements is chosen such that their function and general purpose become apparent to a person skilled in the art.

FIG. 1 is a schematic drawing showing a sectional side view of a connector 100 according to an embodiment of the invention. The connector 100 is a wet-mateable subsea connector, i.e. it is adapted to be mated in seawater when deployed at a subsea location. Connector 100 may be adapted to be mated in a water depth in excess of 1,000, 2,000 or even 3,000 meters.

Connector 100 has a first connector part 10 in form of a receptacle part and a second connector part 20 in form of a plug part. The receptacle 10 has a support 13 from which a pin 12 extends. The pin 12 has a coupling portion 11, which in the embodiment of FIG. 1 is an electrical coupling portion which may be provided as a circumferential electrical contact. A conductor 14 provides an electrical connection to the cable or the termination assembly to which the receptacle is mounted. In other embodiments, an optical coupling portion 11 may be provided for establishing an optical connection. It is also conceivable to simultaneously provide electrical and optical coupling portions.

The first connector part 10 further comprises a first protection assembly 15 which prevents seawater from reaching the coupling portion 11 when the first connector part 10 is deployed subsea in an unmated state, which is illustrated in FIG. 1. The first protection assembly 15 comprises the sliding carriage 16 which is sealed against a front portion of the pin 12 and further a flexible diaphragm 17. The flexible diaphragm 17 can be filled with a dielectric liquid and due to its flexibility has an intrinsic volume compensation functionality. The sliding carriage 16 can be moved backwards, i.e. away from the front portion 18 of the pin 12 (also termed "pin tip"), so as to expose the coupling portion 11. Coupling portion 11 is thus enabled to engage a complementary coupling portion for making contact. When sliding backwards, the flexible diaphragm 17 can be folded so as to accommodate the change in distance/available space. Furthermore, the front portion 18 of pin 12 forms part of the protection assembly 15, as it prevents seawater from entering the space enclosed by the diaphragm 17 and the sliding carriage 16.

The second connector part 20 is provided in the form of a plug part having a plug body 23 and a front portion of the plug 24 (also termed "plug nose"). In the second connector part 20, a second coupling portion 21 is provided, which in the embodiment of FIG. 1 has the shape of a contact sleeve having a compliant component for making contact. The second coupling portion can for example be provided as a socket contact. An electrical conductor (not shown) connected to a subsea cable, a power distribution unit or the like is in electrical contact with the second coupling portion 21. In the example of FIG. 1, the second coupling portion 21 is an electrical coupling portion; in other embodiments, an optical second coupling portion may be provided, or even optical and electrical second coupling portions may be provided. First coupling portion 11 and second coupling portion 21 can be brought into engagement to provide an electrical connection (or an optical connection in case of optical coupling portions).

The second connector part 20 further comprises a second protection assembly 25 which prevents the second coupling portion 21 from being exposed to seawater. The second protection assembly 25 includes at least the front portion 24 of plug body 23 and a shuttle pin 22 which can be pushed back into the plug body 23, so as to expose the second coupling portion 21 during mating. The shuttle pin 22 is sealed against the front portion 24 of the plug body 23 in the unmated state of the connector 100. Just for the purpose of illustration, a spring 26 is shown which holds the shuttle pin 22 in a sealing engagement with the front portion 24 of the plug part 20 in the unmated state.

As can be seen, in the illustrated embodiment, a front portion of the pin 12 and a front portion of the shuttle pin 22, in particular the front faces 51 of the pin 12 and 52 of the shuttle pin 22 are exposed to the ambient environment in the unmated condition of connector 100. During mating, the front face 51 of pin 12 is brought into contact with the front face 52 of shuttle pin 22, the pin 12 pushing the shuttle pin 22 into the plug body 23. During such mating operation, seawater adhering to the front faces 51, 52 of the pin 12 and the shuttle pin 22 can be dragged into the plug body 23 and can accordingly come into contact with the first and second coupling portions 11 and 21. Furthermore, part of the surface of pin 12 may be exposed to seawater during mating, e.g. after it is exposed by the sliding carriage 16 and before it enters the plug body 23 through seal 27. To prevent the ingress of seawater, the connector 100 comprises a flushing arrangement 30 which is configured to enable the flushing of a surface of the protection mechanisms 15 and 25, in particular the front face 51 and 52.

In particular, the flushing arrangement 30 is configured to flush the front face 51 or a front portion 18 (up to the respective seal 33) of the pin 12, and a front face 52 or front portion (also up to the respective seal 33) of the shuttle pin 22. The front face 51 of pin 12 and the front face 52 of shuttle pin 22 may also be termed "exposed surfaces", as they are exposed to seawater in the unmated state of the connector 100.

In the embodiment of FIG. 1, the flushing arrangement has a first element 31, which is mounted to the first connector part 10, in particular to the sliding carriage 16. It further comprises a second element 32 which is mounted to the second connector part 20, in particular to the front portion 24 of the plug body 23. The first element has an annular shape with an inner opening having a cylindrical face. The seal 33 is provided between this inner cylindrical face of the first element 31 and the outer cylindrical face of the pin's front portion 18. The configuration is such that the first element 31 can, together with the sliding carriage 16, slide along the outer surface of the pin 12 into a mated position in which the first coupling portion 11 is exposed. The seal 33 may for example be some type of gland seal or piston seal. The first element 31 furthermore has an inlet port 35 connectable to a fluid source and an outlet port 36 via which a fluid can be discharged. It is furthermore provided with flow channels 37 and 38.

The second element of the flushing arrangement 30 is sealed against a front portion of the shuttle pin 22 by a corresponding seal 33. Similarly, it has an annular shape with an inner opening, the diameter of which substantially corresponds to the outer diameter of the pin 12 and of the shuttle pin 22. A annular front face of the second element 32 is provided with a circular seal 34. The seal 34 is set up to provide sealing against an annular front face of the first element 31.

Note that "front" has to be understood with respect to the respective connector part 10 or 20. The front of the respective connector part is considered to be the part in which the tip of the pin 12, or the tip of the shuttle pin 22 is located. Backwardly or rearwardly means towards the other end of respective connector part, e.g. towards the support 13 for the first connector part 10.

Seal 34 is set up to provide sealing against the front face of the first element 31 of the flushing arrangement 30. Since seal 34 is a circumferentially continuous seal, a closed sealed space is formed between the first and second elements 31, 32, when the front face of the first element 31 and the front face of the second element 32 abut. A chamber is thus formed which is bordered by the first and second elements 31, 32, a front portion of the pin 12 and a front portion of the shuttle pin 22. In this chamber, the front portions of the pin and shuttle pin 12, 22 can be flushed efficiently, as will be described hereinafter.

Note that although the flushing arrangement 30 of FIG. 1 comprises two separate parts 31 and 32, the flushing arrangement may in other embodiments only have a single independent element 31 or 32, with the other element being part of the respective connector part or protection assembly. As an example, only a second element 32 may be provided, with the seal 34 directly sealing against the sliding carriage 16. In even other embodiments, only the first element 31 may be provided as an individual element, and the seal 34 may be provided at the front face of the first element 31. Sealing may then occur directly against a second element comprising e.g. a front face or the front portion 24 of the plug body 23. Furthermore, the inlet and outlet ports 35, 36 and the flow channels 37, 38 may be provided in the second element 32, or they may be provided in both elements 31, 32.

The first and second elements 31, 32 may for example be first and second cartridge parts of a cartridge. They may be made of a plastic material, in particular a polymer material, e. g. a thermoplastic material. In a particular configuration, the first and second elements 31, 32 can be made out of PEEK, preferable PTFE-loaded PEEK.

Other embodiments are certainly conceivable. As an example, the first and/or second element of the flushing arrangement 30 may not be made of a plastic material, but of metal. Although in plastic material, more complex flow channel structures may be provided, using metal as a material for the first and second elements 31, 32 makes the flow arrangement more robust.

FIG. 1 shows the connector 100 in an unmated position, with the first element 31 slightly protruding from the front face 51 of the pin 12. In other embodiments, the first connector part 10 may be configured so that the first element 31 of the flushing arrangement 30 is positioned rearwardly of the front face 51 of pin 12, so that the pin 12 slightly protrudes from the first element 31. In this way, the flow channels 37, 38 are protected and the danger of clogging these channels, e.g. due to marine growth or dirt, is reduced.

Figure 2:
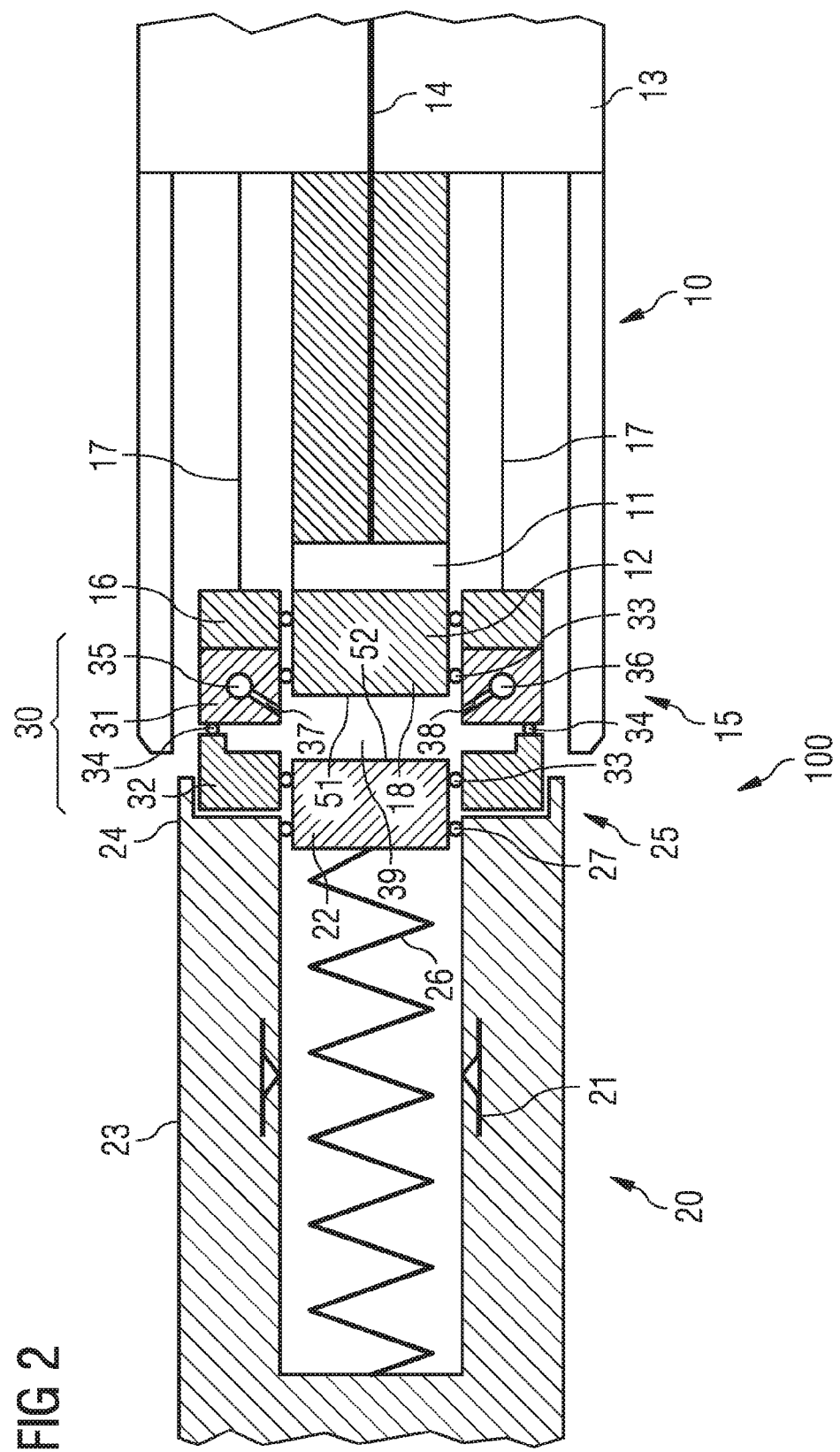
FIG. 2 is a schematic drawing showing a sectional view of the connector of FIG. 1 in a first mated state.

In the schematic diagram of FIG. 2, the connector 100 of FIG. 1 is shown in a first mated state. In the first mated state, the first element 31 and the second element 32 of the flushing arrangement 30 are sealed against each other by the seal 34, thereby forming a chamber 39. The chamber 39 is bounded by the first element 31, the second element 32, and the front portions of pin 12 and of receptacle pin 22. The first element 31 has an annular front face which faces an annular front face of the second element 32 on which the seal is provided. Accordingly, the sealing between the first and second elements 31, 32 occurs by seal 34 between the two annular front faces. The chamber 39 is thus sealed in a liquid-tight manner against the outside environment, i.e. against the seawater surrounding the first and second connector parts 10, 20 when deployed subsea. Chamber 39 thus allows the front faces 51, 52 of pin 12 and receptacle pin 22 to be flushed, it may also be termed "flushing chamber".

In the first mated state illustrated in FIG. 2, the first coupling portion 11 is not engaged with the second coupling portion 21. In the first mated state, there is accordingly no connection established between the first and second connector parts 10, 20, but the first mated state enables the flushing of the exposed surfaces of pin 12 and receptacle pin 22. It may thus also be termed "flushing state" or "flushing position".

For flushing, a liquid, in particular a dielectric liquid such as oil is introduced into the chamber 39 via the inlet port 35 and replaces the seawater that is initially located in the chamber 39. The seawater is discharged through the outlet port 36 via the outlet channel 38. The ports at the flow channels within the first and/or second elements 31, of the flushing arrangement 30 are configured so as to allow an almost complete exchange of the seawater with the non-seawater medium, in particular with the dielectric liquid during flushing. The flow channels can be configured so as to create a flow within chamber 39 that has no stagnation points, so that seawater is not trapped at such points. This may be achieved by implementing the first and second elements 31, 32 as parts of a cartridge, as described further below. Such cartridge may be used with the present embodiment.

After flushing, seawater will generally no longer adhere to the front portions of pin 12 and of receptacle pin 22, thus reducing the danger of seawater being dragged into the plug body 23 in the further mating procedure.

The first and second connector parts may be held in place in the first mated position, for example by a mechanical engagement of the front portion of the plug body with the front portion of the receptacle. In other embodiments, a mating tool may be used for holding the first and second connector parts 10, 20 in the first mated position. Such tool may for example be part of an ROV or it may be an ROV-operated tool (not shown). Furthermore, such mating tool may provide the non-seawater medium to the inlet port 35 and may furthermore comprise a tank for taking up fluid discharged through the outlet port 36. The mating tool may comprise corresponding couplings for coupling to the inlet port 35 and the outlet port 36.

Figure 3:
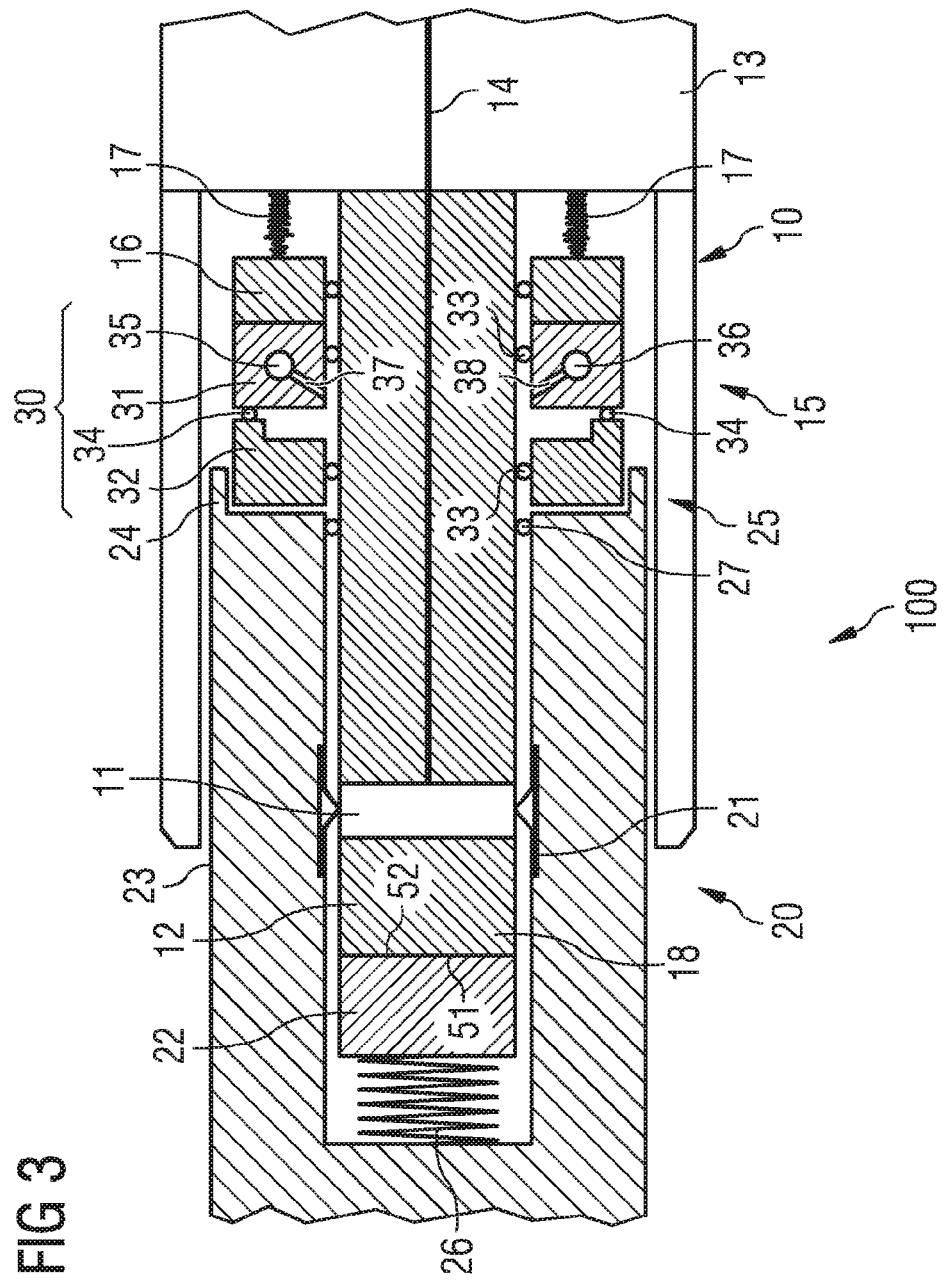
FIG. 3 is a schematic drawing showing a sectional view of the connector of FIGS. 1 and 2 in a second mated state.

After flushing is completed (for example after a predetermined amount of time after which the fluid in chamber 39 is almost completely replaced by non-seawater medium), the connector 100 is brought from the first mated position illustrated in FIG. 2 into the second mated position illustrated in FIG. 3. This transition occurs by moving the first and second connector parts 10, 20 axially towards each other, i.e. by pushing the plug part 20 into the receptacle part 10 or vice versa. Accordingly, when moving from the first mated position into the second mated position, the plug body 23 enters the receptacle 19 of the first connector part 10. The front portion 24 of the plug body 23 and/or the second element 32 push the sliding carriage 16 and the first element 31 backwards along the pin 12 so as to expose the first coupling portion 11. Simultaneously, the front portion of the pin 12 enters the chamber 39 and comes into contact with the front portion of the receptacle pin 22. Upon further movement of the first and second connector parts 10, 20 towards each other, the pin 12 pushes the shuttle pin 22 into the plug body 23, the pin 12 moving through the seal 27 and entering the plug body 23. The pin 12 enters the plug body 23 until it reaches a final position in which the first coupling portion 11 is in contact with the second coupling portion 21. This final mating state (i.e. fully mated state or position) is illustrated in FIG. 3.

As can be seen, since the front faces 51, 52 of the pin 12 and the receptacle pin 22 were flushed prior to moving into the final mated position, it can be prevented that seawater enters the plug body 23. Furthermore, the surface resistivity of the receptacle pin can be preserved, which would otherwise be adversely affected by contact with seawater. A high quality and reliable connection can thus be established between the first and second coupling portions 11 and 21.

When moving from the first mated state of FIG. 2 into the second mated state of FIG. 3, the pin 12 enters the chamber 39, thus reducing the volume of the chamber. The flushing arrangement 30 can be provided with a volume compensation device (or volume compensator) which can provide compensation for this change in volume. Several implementations of such volume compensator are conceivable. Volume compensation may be achieved by way of certain valves connected to the inlet and/or outlet ports 35, 36. As an example, fluid may be allowed to flow out of chamber 39 through the outlet port 36 if the pressure inside chamber 39 exceeds the threshold value. Other devices include a flexible element, such as a bladder or bellows, which is in fluid communication with the chamber 39 so that it can take up fluid from chamber 39. Thus, a change of the internal volume of chamber 39 is allowed while maintaining the pressure within chamber 39 relatively constant.

Figure 4:
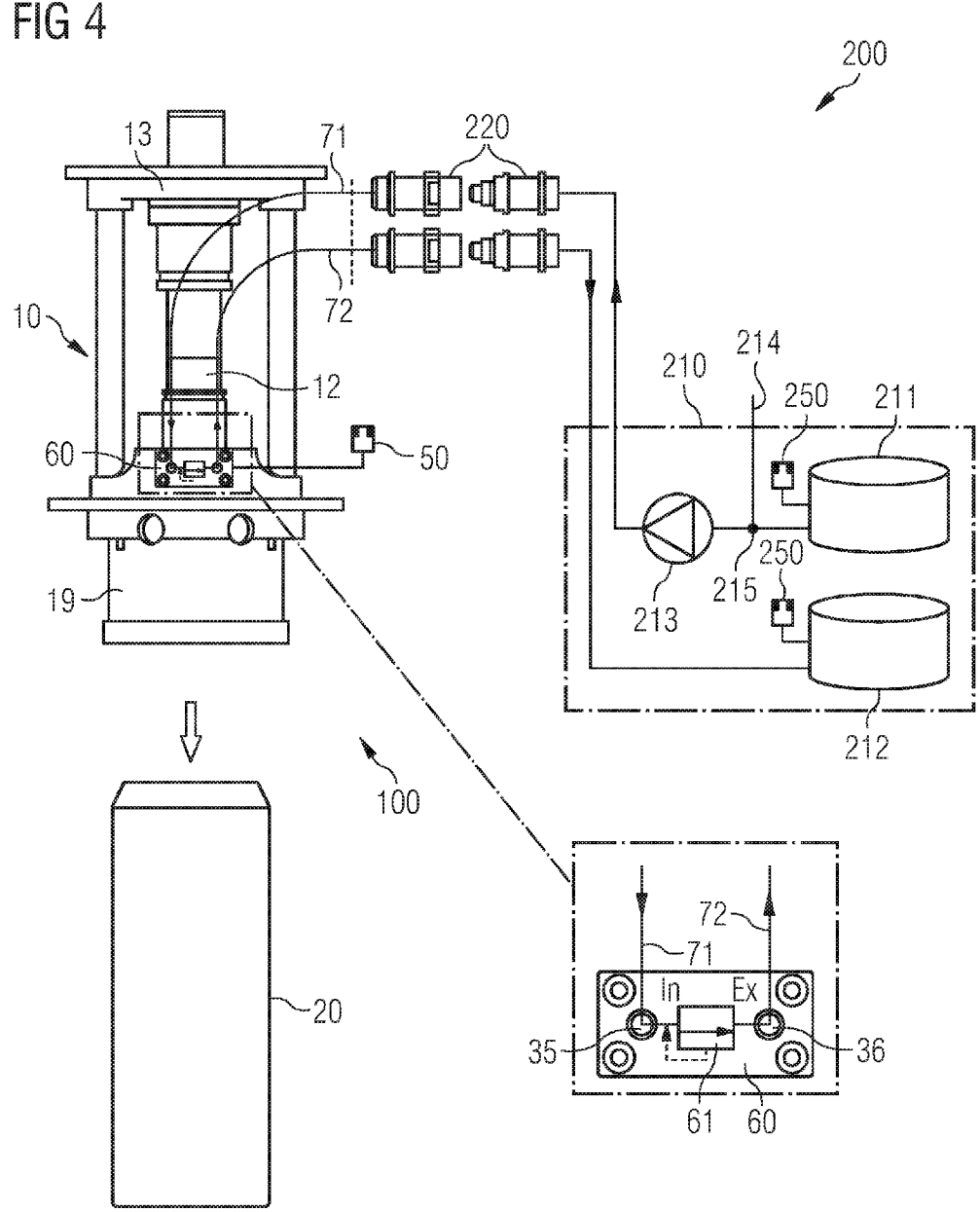
FIG. 4 is a schematic drawing showing a subsea connection system according to an embodiment of the invention.

FIG. 4 is a schematic drawing showing a subsea connection system 200 according to an embodiment of the invention. The subsea connection system 200 may employ a subsea connector 100 in any of the configurations described herein. Accordingly, the explanations given above with respect to FIGS. 1, 2 and 3 are equally applicable to the connector 100 of FIG. 4. In FIG. 4, the mating direction of the first connector part 10 and the second connector part 20 is indicated by an arrow. On the first connector part 10, the support 13, the pin 12 extending forwardly from the support 13 and the receptacle 19 are shown. Furthermore, a volume compensation device 50 is illustrated which is adapted to compensate volume changes of the flushing chamber 39, i.e. to take up a fluid from the flushing chamber 39 when the pin 12 moves into the flushing chamber 39, as described above. The flushing arrangement 30 further comprises a pressure limitation device 60, which is preferably mounted to the connector part on which the inlet port 35 and the outlet port 36 are provided.

The inset of FIG. 4 shows an enlarged drawing of a possible implementation of the pressure limitation device 60. Pressure limitation device 60 is configured to limit the pressure that is present in the flushing chamber 39 during flushing. Thus, it can be prevented that the pressure inside chamber 39 pushes the receptacle pin 22 into the plug body 23. The pressure limitation device 60 includes a pressure relief valve 61 which is connected between the inlet port 35 and the outlet port 36. The pressure relief valve 61 has a pressure threshold. The pressure relief valve 61 is configured to open if the pressure on its input side exceeds the pressure threshold. Accordingly, fluid supplied via supply line 71 is allowed to flow back via the discharge line 72, thereby preventing a built-up of pressure within the chamber 39. In a normal flushing operation, fluid is supplied to chamber 39 via the supply line 71 coupled to inlet port 35, and fluid discharged from chamber 39 via outlet port 36, and flows via discharge line 72 into a collection tank.

FIG. 4 further illustrates a mating tool 210 which assists in the mating procedure of the first and second connector parts 10, 20. The mating tool 210 in particular performs the flushing operation. For connecting to the supply line 71 and the discharge line 72, the mating tool 210 comprises flow connectors 220, which may be provided in the form of hydraulic couplings. The tool 210 comprises a tank 211 for non-seawater medium, such as a dielectric liquid, in particular oil, such as silicon oil. During flushing, the non-seawater medium can be supplied via the pump 213 and the supply line 71 into the flushing chamber 39. During flushing, seawater and parts of the non-seawater medium are discharged via the outlet port 36 and the discharge line 72. The discharged fluid is collected in the collection tank 212 to prevent pollution of the subsea environment. Each of the tanks 211, 212 may be provided with a volume compensation device 250, so as to compensate for volume changes of the liquid within the tank.

Note that the embodiment of FIG. 4 is only one possible configuration of the subsea connection system 200. In other embodiments, the mating tool 210 may for example comprise a pump coupled to the discharge line 72, so as to create a negative pressure and to essentially "suck" fluid out of the chamber 39 during flushing. The low pressure generated by such pump will in the same way lead to a replacement of the fluid inside the chamber 39 by non-seawater medium from tank 211. The advantage of such configuration is that the danger of pushing the shuttle pin 22 into the plug body 23 is reduced, and the system may not require the pressure limitation device 60.

Furthermore, the subsea connection system 200 can be configured to replace a fluid in the chamber 39 with seawater prior to de-mating of the first and second connector parts 10, 11. For this purpose, the mating tool 210 can comprise a seawater inlet port 214, and a control valve 215. By replacing the fluid inside the chamber 39 with seawater prior to de-mating, a pollution of the subsea environment with non-seawater medium can be prevented.

The mating tool 210 can furthermore comprise a support mechanism for holding the first connector part and the second connector part in the first mated position during flushing. It can thus be ensured that the chamber 39 is formed in a safe and secure manner and that a misalignment of the first and second connector parts 10, 20 and an accidental opening of the chamber can be reduced or prevented. Such mechanical support mechanism may for example comprise a first mechanical coupling part for supporting the first connector part 10 at a second mechanical coupling part for supporting the second connector part 20. The mechanical support mechanism may in some configurations be configured to bring the first and second connector parts 10, 20 from the first mated state into the second mated state.

The mating tool 210 may form part of an ROV (remotely operated vehicle), or it may be configured as an ROV-tool.

Figure 5A:
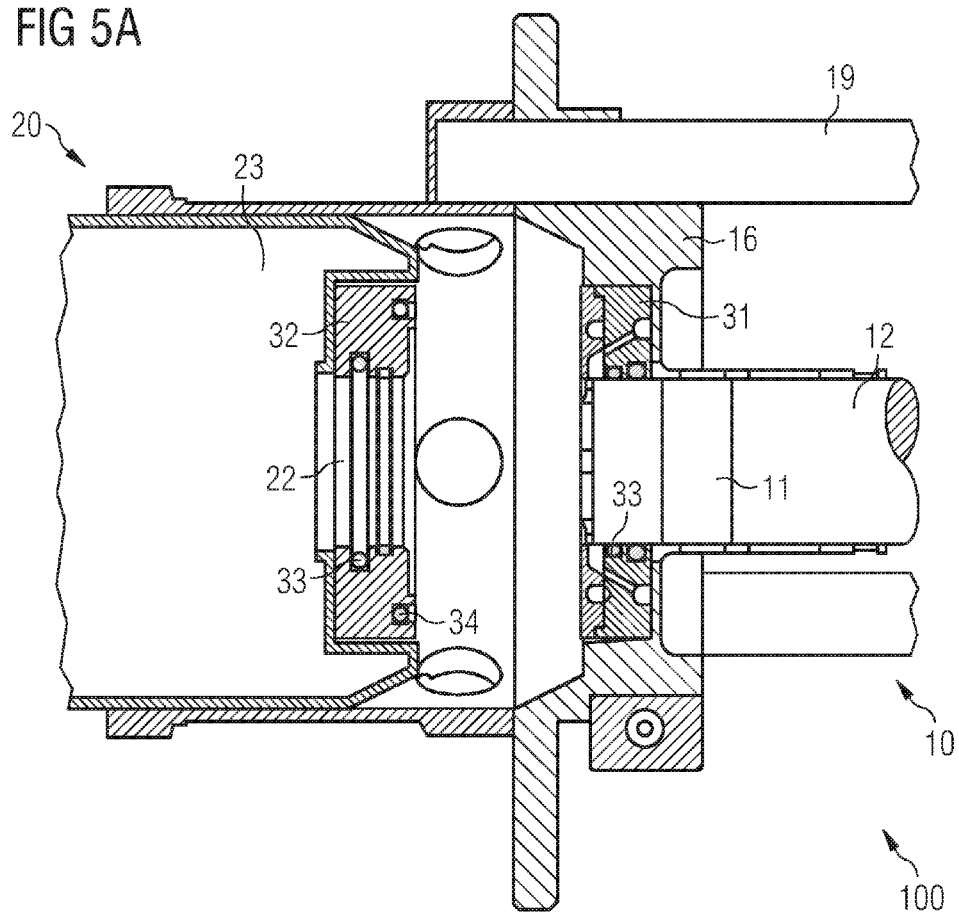
FIGS. 5A, 5B and 5C are schematic drawings illustrating a connector according to a further embodiment of the invention and showing details of the flushing arrangement according to an embodiment of the invention.

FIG. 5 shows a further embodiment of a connector 100 according to the invention. Only the front portions of the first and second connector parts 10, 20 are illustrated in FIG. 5A. Since the connector configuration corresponds in large parts to the one of the connector 100 of FIGS. 1 to 4, the explanations given above are equally applicable to the embodiment of FIG. 5. The protection assembly 15 of the first connector part 10 again comprises a front portion of pin 12 and the sliding carriage 16. The protection assembly of the second connector part 20 comprises the front portion of shuttle pin 22 and the front portion of the plug body 23.

In FIG. 5A, the first and second connector parts 10, are shown in a position prior to forming the flushing chamber 39, i. e. in a position prior to reaching the first mated state. The first and second elements 31, 32 of the flushing arrangement 30 are in FIG. 5 implemented as parts of a cartridge. As can be seen, the first cartridge part 31 is, via the pin seals 33, sealed against the front portion of the pin 12. Similarly, the second cartridge part 32 is sealed against the shuttle pin 22 by the pin seals 33. The second cartridge part 32 comprises the circular seal 34, which may also be termed "environmental seal" as it seals, in the first mated state, the chamber 39 against the surrounding subsea environment.

Figure 5B:
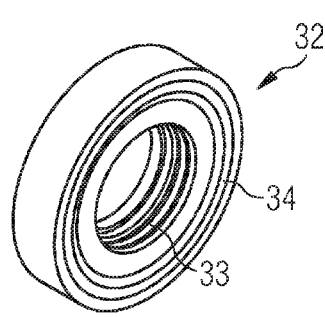
Figure 5C:
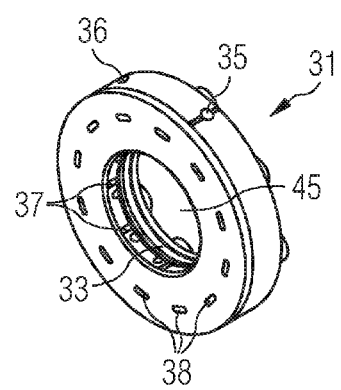

The first and second cartridge parts 31, 32 are in more detailed illustrated in FIGS. 5B and 5C. FIG. 5B shows the second cartridge part 32 including the environmental seal 34 and the pin seals 33. The environmental seal 34 is provided on an annular front face of the second cartridge part 32. The first cartridge part 31 is illustrated in FIG. 5C. The first cartridge part 31 comprises flow channels 37, 38 for generating a flow without stagnation points within the flushing chamber 39. The first cartridge part 31 includes the inlet port 35 and the outlet port 36. Inlet distribution channels 37 are provided which connect the inner port 36 to the inside of the chamber 39. Furthermore, outlet collection channels 38 are provided through which fluid can leave the chamber 39. The outlet collection channels 38 are in fluid communication with the outlet port 36.

Figure 6:
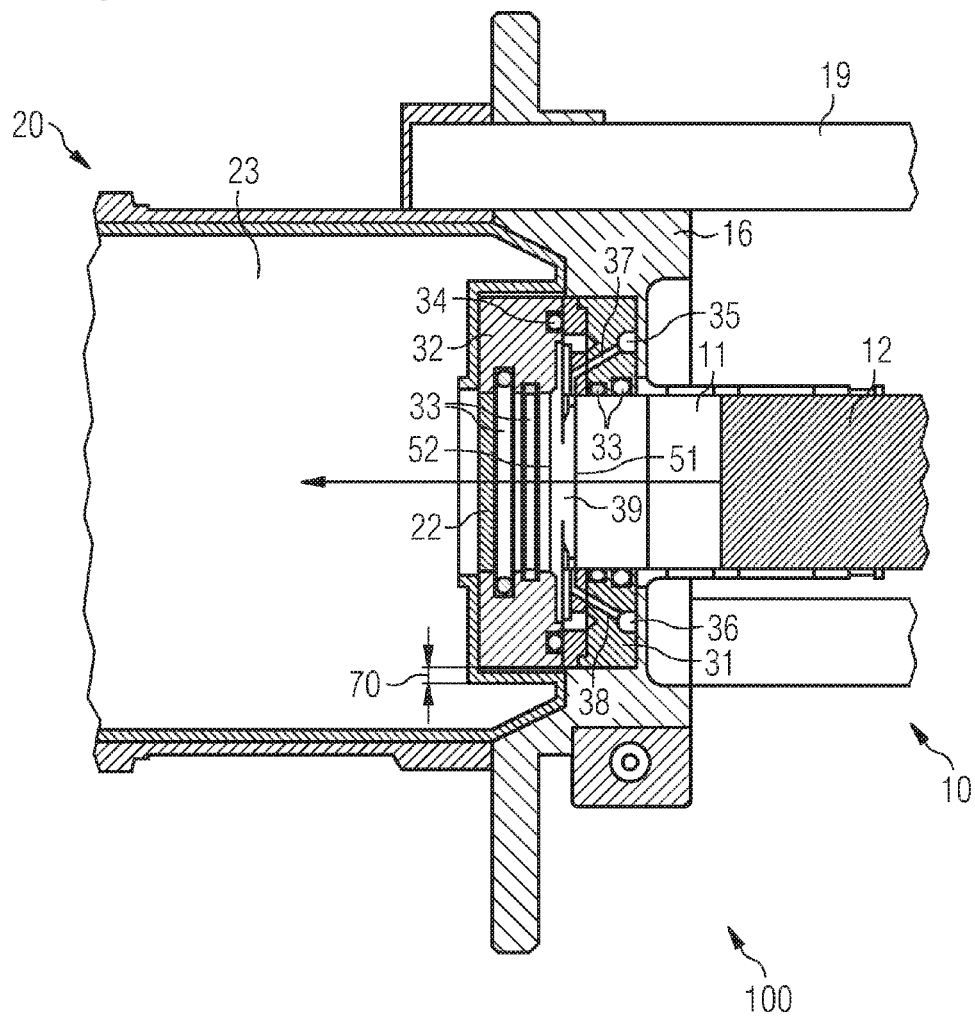
FIG. 6 is a schematic drawing showing details of the connector of FIG. 5A in the first mated state.

The connector 100 of FIG. 5A is shown in the first mated state in FIG. 6. As can be seen, the first and second cartridge parts 31, 32 are sealed against each other by way of the environmental seal 34. Note that in other embodiments, intervening elements may be provided. As an example, a locking ring may be provided which locks the first cartridge part 31 in place in the sliding carriage 16, and the seal 34 may seal against such locking ring. In even other embodiments, only one cartridge part comprising inlet and outlet ports 35, 36 and the flow channels 37, 38 may be provided, and may directly be sealed against a component of the first or second connector part. FIG. 6 illustrates that in the first mated state, the chamber 39 is formed between the first and second cartridge parts 31, 32 and the front portions of pin 12 and of shuttle pin 22.

FIG. 6 furthermore illustrates the flow of fluid into the chamber 39 and out of the chamber 39. Note that although in FIG. 6, the inlet port 35 is shown on the upper part of the cartridge and the outlet port 36 is shown on the lower part of the cartridge, these ports may be arranged differently, and the structure of the flow channels 37, 38 may be more complex, for example as shown in FIG. 5C or 7 and explained further below. In this respect, FIG. 6 only schematically illustrates the functioning of an exemplary flushing mechanism.

Reference numeral 70 indicates a tolerance in radial direction in the mount of the second cartridge part 32 in the front portion of the plug body 23. In this way, a floating mount is achieved which allows a small movement of the second cartridge part 32 in radial direction. This so called "radial float" can assist the alignment when moving into the second mated position, i.e. into the fully mated position, and can reduce the likelihood of seal damage. As an example, when the pin 12 moves into the chamber 39 and into engagement with the shuttle pin 22, the radial float allows the second cartridge part 32 to align itself with the front portion of the pin 12, so that the alignment of the two pins 12 and 22 can be assisted and that damage to the seals can be prevented. While the environmental seal 34 (which seals between the annular front faces of the first and second cartridge parts 31, 32 and may thus also be termed "face seal") is relatively tolerant to a radial misalignment, a misalignment between the pin 12 and the second cartridge part 32 may lead to a collision of the pin 12 with a gland seal 33, which can damage the seal. This can be prevented by the radially floating cartridge part 32.

FIG. 7 illustrates a first element 31 of a flushing arrangement 30, which is implemented as a first cartridge part. As mentioned above, the flushing arrangement 30 may comprise a complementary second cartridge part, or only the first cartridge part may be provided and may be sealed against a surface of the second connector part. In other embodiments, the first cartridge part may be provided in the second connector part and may be sealed against a surface of the first connector part or against a second cartridge part mounted to the first connector part.

The first cartridge part 31 of FIG. 7A has an annular shape with a through hole or opening 45 through which the pin 12 reaches during mating. The opening 45 is bounded by an inner cylindrical face 46. The inner cylindrical face comprises a sealing portion 48 which is adapted to be sealed against a part of the connector 100, in particular against a surface to be flushed. As outlined with respect to the above embodiments, the surface to be flushed may be a surface on a front portion of the pin 12, and accordingly, the sealing portion 48 can be adapted to be sealed against a front portion of the pin 12. The cartridge part 31 may furthermore comprise seals provided in the sealing portion 48, it may for example comprise the above mentioned pin seals 33. In other embodiments, the sealing portion 48 may be provided at a different location, for example at an annular back face of the cartridge part 31, e.g. for sealing against the sliding carriage 16 or against a front surface of the plug body 23. In even other embodiments, the sealing portion 48 may be adapted for a sealing against a front portion of the shuttle pin 22.

With respect to FIGS. 7A to 7C, the flow channels that were only shown and described in a simplified configuration with respect to the FIGS. 1 to 6 are now explained in more detail. The flow channels 37, 38 comprise an inlet flow channel 41 which has a fluid connection to the inlet port 35. The inlet flow channel 41 is a circular flow channel extending circumferentially in the annular body of the first cartridge part 31. Furthermore, an outlet flow channel 43 connected to outlet port 36 is provided which similarly has a circular shape and extends circumferentially in the body of the first cartridge part 31. The inlet flow channel 41 may also be termed "inlet ring". The outlet flow channel 43 may also be termed "outlet or exhaust ring".

As can be seen in the sectional side view of FIG. 7A, the inlet flow channel 41 and the outlet flow channel 43 may be arranged at the same radial distance, yet they may in other embodiments be arranged at different radial distances. Accordingly, in the sectional top view of FIG. 7B, the inlet flow channel 41 and the outlet flow channel 43 lie above each other, so that only one of them is visible.

As already illustrated in FIG. 7A, plural inlet distribution channels 42 are formed in the first cartridge part 31 and provide a flow connection between the inlet flow channel 31 and the interior of the opening 45, which in operation can form the flushing chamber 39. FIG. 7B, in which the inlet flow channel 41 is not visible, shows that the inlet distribution channels 42 provide the flow connection through the circumferential inner face 46 of the opening 45. The ports formed by the flow channels 42 ending in the inner cylindrical face 46 may be termed "inlet distribution ports". As shown in FIG. 7B, the inlet distribution channels 42 and the corresponding inlet distribution ports may be distributed around the opening 45, and they may be spaced equidistantly in a circumferential direction. As indicated by arrows, fluid can thus be injected into a chamber formed by the opening 45 from different positions around the inner cylindrical face 46 bounding the chamber during flushing.

In order to create a turbulent flow without stagnation points, outlet collection channels 44 are provided which provide a fluid connection from the opening 45 to the outlet flow channel 43, as shown in FIG. 7B. Besides this first set of outlet collection channels 44, a second set of outlet collection channels 47 can be provided which terminate in the annular front face of the first cartridge part 31. The flow connections through the inner cylindrical face 46 and through the annular front face of the first cartridge part 31 may be termed "outlet collection ports". As shown in FIG. 7B, the first and second sets 44 and 47 of outlet collection channels are again distributed around the opening 45 and are spaced equidistantly in circumferential direction. The inlet distribution channels 42 and the first set of outlet collection channels 44 may for example be provided in a staggered configuration so as to create a flow with relatively high turbulences. Accordingly, no stagnation points form within the opening 45 during flushing.

Furthermore, the outlet collection ports of the second set of outlet collection channels 47 can be placed relatively close to the area in which the sealing by seal 34 is provided, as illustrated in FIG. 4C. Accordingly, also liquid which may be trapped between the two front faces of the two opposing cartridge parts can be removed efficiently from the flushing chamber 39 formed between the cartridge parts (or between a cartridge part and another surface, e.g. plug front face).

Furthermore, the outlet collection channels 47 may be provided at an angle, so as to cause a clockwise or anti-clockwise flow in the outlet flow channel 43.

FIG. 7B indicates by arrows the primary flow of fluid. The fluid enters the inlet ring 41 tangentially via the inlet port which may be connected at an angle. This can cause a clockwise or anti-clockwise fluid flow in the inlet ring 41. The fluid exits the inlet ring 41 via the radial inlet distribution channels 42 which direct the flow over the receptacle pin tip and towards the pin centre during flushing. By way of multiple flow paths towards the centre, turbulence can be caused and stagnation of fluid prevented. This removal of liquid from the chamber 39 occurs via the outlet collection channels 44 which are aligned essentially parallel to the radial inlet distribution channels 42. As indicated by arrows, the flow is guided into the outlet ring 43. The outlet collection ports increase the turbulence in the flow. A secondary flow is created towards the annular front face of the first cartridge part 31 towards the sealing surface for the seal 34, which is indicated in FIG. 7C. The flow is directed into the outlet ring 43 by way of the second set of outlet collection channels 47. The second set of channels 47 creates a clockwise or anti-clockwise flow in the outlet ring 43, which can be connected to the outlet port 36 by a tangentially oriented gallery, thus facilitating the discharging of fluid.

Note that FIGS. 7A to 7C show only one possible implementation of the first cartridge part 31 of the flushing arrangement 30. In other embodiments, a different configuration of the flow channels can be provided. Preferably, the flow channels are arranged such that in the flushing chamber formed by the first cartridge part 31, a flow with relatively high turbulence and without stagnation points is created.

Besides the first cartridge part 31, the flushing arrangement 30 can comprise further elements, such as the second cartridge part 32, which is described further above, e.g. with respect to FIG. 5B.

It should be clear that the first cartridge part 31 may be used in any of the above described embodiments of the connector 100, it may for example be used for the first element 31 or the second element 32 of the flushing arrangement 30 of the respective connector.

FIG. 8 shows a flow diagram of a method according to an embodiment of the invention. In a first step 301, the first and second connector parts of the subsea connector 100 are provided in a subsea location. In the next step 302, the first and the second connector parts are brought into a first mated position in which the first coupling portion 11 and the second coupling portion 21 are disengaged. A mating tool 210 as described with respect to FIG. 4 may for example be used for bringing the connector parts into the first mated position and for holding them in this position.

When bringing the first and second connector parts into the first mated position, a flushing chamber 39 is formed by way of the first cartridge part 31 and the second cartridge part 32 (step 303). Since the chamber is formed in a subsea environment, it will initially be filled with seawater. In step 304, the seawater in the chamber is displaced by filling the chamber through an inlet port of the cartridge with a non-seawater medium, in particular with a dielectric liquid. In this way, the front faces of the pin 12 and of the shuttle pin 22 are flushed.

In step 305, the first and second parts are brought into the second mated position by axial movement of the first connector part and the second connector part towards each other. Depending on the configuration, either the first connector part or the second connector part may be mounted, e.g., to a step plate, termination unit or the like, and the respective other connector part may be moved into further engagement to reach the second mated position. By bringing the first and second connector parts into the second mated position, the first coupling portion is engaged with the second coupling portion to form an electrical or optical connection. As outlined further above, in some embodiments, an electrical and an optical connection may be formed.

By way of such method, a relatively simple mating of the first and second connector parts can be achieved, while there is essentially no exposure of the coupling portions of the first and second connector parts to seawater. Mating can occur in a clean environment, and due to the protection of the first and second coupling portions, marine growth and a degradation of the connection can be prevented.

The above described method may be performed with any of the embodiments of the connector 100 and of the subsea connection system 200 described above.

As can be seen from the above, by way of the flushing arrangement, it is possible to displace seawater from the front portions of the pin and the shuttle pin, whereby surface resistivity of the pin can be preserved as it passes through the plug body during the mating procedure.

Accordingly, problems which can occur due to a reduction in surface resistivity due to seawater, such as reduced connector performance in particular at elevated voltages can be mitigated or even prevented. By way of the above described cartridge, it is possible to promote a turbulent flow and to prevent stagnation points, so that an almost complete and reliable displacement of seawater can be obtained. The material of the cartridge and the seals prevents marine growth on the sealing surfaces, so that the sealing performance does not degrade substantially over time. The ingress of seawater into the flushing chamber may thus be prevented. The material of the cartridge also enables the use of the above described flow channel structure. Furthermore, the flushing chamber has a relatively low volume, which minimizes the use of non-seawater medium and furthermore reduces the effort required to clean the exposed surfaces to a relatively high standard.

The cartridge as described above may in addition provide an additional barrier to seawater in an area of the respective connector part which is traditionally prone to high electrical stresses. Also, since a cartridge is used, relatively little modification on the respective connector part is necessary. The connector remains functional even without the use of the flushing arrangement, the cartridge may for example be replaced by a dummy cartridge for applications which are less critical with respect to the contact with seawater.

While specific embodiments are disclosed herein, various changes and modifications can be made without departing from the scope of the invention. The present embodiments are to be considered in all respects as illustrated at non-restrictive, and all changes coming within the meaning and equivalency range of the appended claims are intended to be embraced therein.

The invention claimed is:

1. A flushing arrangement for flushing a surface of a wet-mateable connector for subsea use, the surface being exposed to seawater when the connector is deployed subsea, the flushing arrangement comprising:
    an inlet port to receive a fluid from a fluid source and an outlet port to discharge a fluid;
    a cartridge adapted to form a chamber around the surface to be flushed prior to flushing, wherein the cartridge includes a sealing portion adapted to be sealed against a part of the connector, the cartridge including
        plural flow channels formed in said cartridge, said plural flow channels comprising flow channels to provide a fluid connection between the inlet port and the chamber to enable a flow of fluid into the chamber and flow channels to provide a fluid connection between the chamber and the outlet port to enable a flow of medium out of the chamber,
    wherein the cartridge does not form part of a housing of the connector, and wherein the cartridge is mountable to a front portion of a connector part of the connector so as to be exposed to the subsea environment when the connector part is deployed subsea.

2. The flushing arrangement of claim 1, wherein the outlet port is connectable to a collection tank for collecting fluid discharged from said chamber.

3. The flushing arrangement of claim 1, wherein the surface to be flushed is an exposed surface that is exposed to the subsea environment when the connector is deployed subsea, the cartridge being adapted to form said chamber around said surface.

4. The flushing arrangement of claim 1, wherein the connector has a first connector part comprising a pin and a second connector part comprising a shuttle pin, the pin and the shuttle pin having front faces that are exposed to seawater when the connector is deployed subsea, wherein the cartridge is configured to form the chamber such that a front face of the pin and a front face of the shuttle pin are located within said chamber.

5. The flushing arrangement of claim 1, wherein said sealing portion is provided on an inner cylindrical face of the cartridge and is adapted to provide sealing against an outer cylindrical face of a pin of a connector part of said connector.

6. A connector for subsea use, the connector including a first connector part and a second connector part adapted to be mated subsea, the connector comprising:
    a first coupling portion arranged in the first connector part;
    a second coupling portion arranged in the second connector part, wherein the first and second coupling portions are configured to be brought into engagement for establishing an electrical or optical connection when the first connector part and the second connector part are mated, and wherein the first and second coupling portions are protected from exposure to seawater when the connector is unmated and deployed subsea by first and second protection assemblies; and
    the flushing arrangement of claim 5.

7. The flushing arrangement of claim 5, wherein said sealing portion and said inner cylindrical face form part of a first cartridge part of the cartridge, and wherein a second cartridge part of the cartridge comprises a second inner cylindrical face and a second sealing portion adapted to provide sealing against an outer cylindrical face of a shuttle pin of a second connector part of said connector.

8. The flushing arrangement of claim 3, wherein said chamber is formed by the first and second cartridge parts such that a front face of the pin and a front face of the shuttle pin are located within said chamber.

9. The flushing arrangement of claim 1, wherein said cartridge includes a first cartridge part adapted to be mounted to a first connector part and a second cartridge part adapted to be mounted to a second connector part of said connector, the flushing arrangement further comprising a sealing element configured to provide a liquid tight seal between said first cartridge part and said second cartridge part when forming said chamber.

10. The flushing arrangement of claim 9, wherein said first and second cartridge parts have an annular shape with annular faces of the first and second cartridge parts facing each other when forming said chamber, the sealing element being provided on at least one of said annular faces.

11. The flushing arrangement of claim 9, wherein the plural flow channels and the inlet and outlet ports are provided in one of the first cartridge part or the second cartridge part.

12. The flushing arrangement of claim 9, wherein the connector includes a first connector part in form of a receptacle part and a second connector part in form of a plug part, wherein the first cartridge part is adapted to be mounted to a protection assembly for a pin of the receptacle part and wherein the second cartridge part is adapted to be mounted to a plug nose of the plug part of the connector.

13. The flushing arrangement of claim 9, wherein the first cartridge part and the second cartridge part each include a cylindrical opening adapted to allow the passing of a pin of a connector part of said connector during mating.

14. The flushing arrangement of claim 1, wherein said plural flow channels comprise an inlet flow channel connected to the inlet port and an outlet flow channel connected to the outlet port, and further comprise plural inlet distribution channels providing flow connections from the inlet flow channel into the chamber and plural outlet collection channels providing flow connections from the chamber to the outlet flow channel.

15. The flushing arrangement of claim 14, wherein said cartridge is formed so as to have an inner cylindrical face forming a boundary of said chamber, and wherein said outlet collection channels comprise a first set of outlet collection channels configured to provide said flow connections through said inner cylindrical face and a second set of outlet collection channels configured to provide said flow connections through an annular face of a first cartridge part of said cartridge facing a corresponding face of a second cartridge part of said cartridge when forming said chamber.

16. A connector for subsea use, the connector including a first connector part and a second connector part adapted to be mated subsea, the connector comprising:
a first coupling portion arranged in the first connector part;
a second coupling portion arranged in the second connector part, wherein the first and second coupling portions are configured to be brought into engagement for establishing an electrical or optical connection when the first connector part and the second connector part are mated, and wherein the first and second coupling portions are protected from exposure to seawater when the connector is unmated and deployed subsea by first and second protection assemblies; and
the flushing arrangement of claim 1.

17. The connector according to claim 16, wherein at least a part of the cartridge is mounted to the first or second protection assembly to provide flushing of a surface of the respective protection assembly that is exposed to seawater when the connector is deployed subsea.

18. The flushing arrangement of claim 1, wherein the plural flow channels are configured to generate a flow without stagnation points in said chamber when providing a fluid via said inlet port.

19. The flushing arrangement of claim 18, wherein said sealing portion is provided on an inner cylindrical face of the cartridge and is adapted to provide sealing against an outer cylindrical face of a pin of a connector part of said connector.

20. A connector for subsea use, the connector including a first connector part and a second connector part adapted to be mated subsea, the connector comprising:
a first coupling portion arranged in the first connector part;
a second coupling portion arranged in the second connector part, wherein the first and second coupling portions are configured to be brought into engagement for establishing an electrical or optical connection when the first connector part and the second connector part are mated, and wherein the first and second coupling portions are protected from exposure to seawater when the connector is unmated and deployed subsea by first and second protection assemblies; and
the flushing arrangement of claim 18.

21. The flushing arrangement of claim 9, wherein said sealing portion and said inner cylindrical face form part of the first cartridge part, and wherein the second cartridge part comprises a second inner cylindrical face and a second sealing portion adapted to provide sealing against an outer cylindrical face of a shuttle pin of a second connector part of said connector.

22. The flushing arrangement of claim 21, wherein said chamber is formed by the first and second cartridge parts such that a front face of the pin and a front face of the shuttle pin are located within said chamber.

23. The flushing arrangement of claim 1, wherein said sealing portion includes a seal.

24. The flushing arrangement of claim 23, wherein said a seal is a gland type seal, a gland seal or a piston seal.

25. The flushing arrangement of claim 1, wherein said cartridge of the flushing arrangement is made of a plastic material.

26. The flushing arrangement of claim 25, wherein said plastic material is a polymer material, such as PEEK.

27. The flushing arrangement of claim 25, wherein said polymer material is PEEK.

28. The flushing arrangement of claim 14, wherein said cartridge is formed so as to have an inner cylindrical face forming a boundary of said chamber, and wherein at least a fraction of said inlet distribution channels are configured to provide said flow connections through said inner cylindrical face.

29. The flushing arrangement of claim 28, wherein said cartridge is formed so as to have an inner cylindrical face forming a boundary of said chamber, and wherein said outlet collection channels comprise a first set of outlet collection channels configured to provide said flow connections through said inner cylindrical face and a second set of outlet collection channels configured to provide said flow connections through an annular face of a first cartridge part of said cartridge facing a corresponding face of a second cartridge part of said cartridge when forming said chamber.

* * * * *